(12) United States Patent
Matina

(10) Patent No.: US 10,603,577 B2
(45) Date of Patent: Mar. 31, 2020

(54) MOVING FLOOR FOR INTERACTIONS WITH VIRTUAL REALITY SYSTEMS AND USES THEREOF

(71) Applicant: VR Moving Floor, LLC, Henderson, NV (US)

(72) Inventor: Nicholas A. Matina, San Diego, CA (US)

(73) Assignee: VR Moving Floor, LLC, Henderson, NV (US)

( * ) Notice: Subject to any disclaimer, the term of this patent is extended or adjusted under 35 U.S.C. 154(b) by 166 days.

(21) Appl. No.: 15/599,681

(22) Filed: May 19, 2017

(65) Prior Publication Data

US 2017/0252642 A1    Sep. 7, 2017

Related U.S. Application Data

(63) Continuation of application No. PCT/US2015/061789, filed on Nov. 20, 2015.

(Continued)

(51) Int. Cl.
*A63F 13/214* (2014.01)
*G06F 3/01* (2006.01)
*A63F 13/98* (2014.01)
*A63F 13/285* (2014.01)
*A63F 13/45* (2014.01)
*A63F 13/50* (2014.01)

(Continued)

(52) U.S. Cl.
CPC ............ *A63F 13/214* (2014.09); *A63F 13/24* (2014.09); *A63F 13/285* (2014.09); *A63F 13/45* (2014.09); *A63F 13/50* (2014.09); *A63F 13/90* (2014.09); *A63F 13/98* (2014.09); *G06F 3/011* (2013.01); *G06F 3/016* (2013.01); *G06F 3/017* (2013.01); *G06F 3/0354* (2013.01); *A63F 2300/8082* (2013.01); *G06F 2203/012* (2013.01); *G09B 9/00* (2013.01)

(58) Field of Classification Search
USPC .......................................................... 463/30
See application file for complete search history.

(56) References Cited

U.S. PATENT DOCUMENTS 4,448,017 A * 5/1984 Stark ...................... F16G 13/12
59/80
4,660,828 A * 4/1987 Weiss ..................... A63B 21/04
200/6 A (Continued)

FOREIGN PATENT DOCUMENTS

WO    1996006664 A1    3/1996
WO    1997042590 A1    11/1997

*Primary Examiner* — Pierre E Elisca
(74) *Attorney, Agent, or Firm* — Benjamin Aaron Adler

(57) ABSTRACT

Provided herein is a multi-functional moving floor device for interacting with virtual environments. Generally, the moving floor device has a substantially hemispherical body with a flat top surface and an inner core, a control module, an action module, a wall module, a computing unit communicably connected with the control module, the action module, the wall module and a virtual reality system with means to activate and deactivate the device and a power module. The moving floor devices may comprise wall-like structures and may simulate virtual walls. Also provided is a user-customized method for interacting with virtual reality via the multi-functional moving floor device.

16 Claims, 20 Drawing Sheets

Related U.S. Application Data

(60) Provisional application No. 62/157,099, filed on May 5, 2015, provisional application No. 62/157,090, filed on May 5, 2015, provisional application No. 62/157,075, filed on May 5, 2015, provisional application No. 62/082,967, filed on Nov. 21, 2014.

(51) Int. Cl.
*A63F 13/90* (2014.01)
*A63F 13/24* (2014.01)
*G06F 3/0354* (2013.01)
*G09B 9/00* (2006.01)

(56) References Cited

U.S. PATENT DOCUMENTS

| | | | | |
|---|---|---|---|---|
| 4,817,960 A * | 4/1989 | Wojcinski | ................ | F41J 13/00 |
| | | | | 273/404 |
| 2011/0214359 A1* | 9/2011 | Magpuri | ................... | E04H 3/22 |
| | | | | 52/9 |
| 2012/0256945 A1* | 10/2012 | Kidron | ................... | A63G 31/16 |
| | | | | 345/619 |
| 2016/0210790 A1* | 7/2016 | Rasane | ................. | G06Q 10/06 |
| 2019/0114797 A1* | 4/2019 | Bleyer | ...................... | G06T 7/75 |

* cited by examiner

MOVING FLOOR FOR INTERACTIONS WITH VIRTUAL REALITY SYSTEMS AND USES THEREOF

CROSS-REFERENCE TO RELATED APPLICATIONS

This application is a continuation under 35 U.S.C. of pending international application PCT/US2015/061789, filed Nov. 20, 2015, which claims benefit of priority under 35 U.S.C. § 119(e) of provisional U.S. application Ser. No. 62/157,099, filed May 5, 2015, of provisional U.S. application Ser. No. 62/157,090, filed May 5, 2015, of provisional U.S. application Ser. No. 62/157,075, filed May 5, 2015, and of provisional U.S. application Ser. No. 62/082,967, filed Nov. 21, 2014, the entirety of all of which are hereby incorporated by reference.

BACKGROUND OF THE INVENTION

Field of the Invention

The present invention relates generally to the field of interactions with virtual reality systems. More specifically, the present invention relates to a moving floor device and system thereof for users to interact with virtual reality environments and systems using user-applied movements on the surface of the device.

Description of the Related Art

Over last few decades, technologies used for interacting with a virtual environment have made significant progress. Especially in the video game industry, companies have released numerous newly designed control systems to enhance the interaction between the users and the virtual environment presented in the video games. For example, NINTENDO implemented a user interface system based on a pointing device for the company's game console WII. This system relies on camera coupled with the pointing device and a beacon to estimate the velocity and trajectory for the motions of the pointing device. The game console then processes the estimated parameters of these motions and reflects them in the picture of the video game. However, the accuracy of this system is very limited, especially for the depth of the motion (distance between the pointing device and the beacon) as all the calculation and estimation of the motions are based on camera captured images. It would be difficult using this system to accurately simulate the distance and velocity of running, crawling, walking, etc. Moreover, the range of the motion (i.e., running or walking distance) for this system is limited to the range of the camera and the dimension of the room where the game console is placed, making it impossible to interact with virtual reality environments that involve long distance running, walking or crawling.

MICROSOFT later on released the KINECT system, which is based on a visual target tracking system. The system eliminated the hand held device and solely relies on a camera and a signal emitter to track the changes of the user's image. This technology significantly improved the accuracy of simulating the depth of the motions. It also enables the system to simulate the subtle movements of a user's whole body. However, the KINECT system did not eliminate the motion range limitation enforced by the coverage range of the camera or the dimension of the room. SONY's PLAYSTATION 4 camera simply enhanced the accuracy of the KINECT system by using dual cameras and further reduced the calculation load of the system. It did not provide any solution to simulate long distance running, walking or crawling.

Recently, more advanced iterations of virtual reality devices have become available to the general public. Among all these virtual reality devices, the OCCULUS RIFT Virtual Reality (VR) Glasses are one of the most prominent in the market. OCCULUS was the first company to make effective virtual reality glasses and mesh it commercially with games like BATTLEFIELD 4, and CALL OF DUTY. Other virtual reality glasses from SAMSUNG, MICROSOFT, and SONY have been developed. However, none of the control/interaction systems discussed above are able to fully take advantage of the walking, running, jumping, and other fluid movement interaction with virtual reality environment.

VIRTUIX (Houston, Tex.) has recently developed one of the first "moving floor", called the VIRTUIX OMNI but the design of VIRTUIX is hindered in several ways. Firstly, the user has a waistband that holds them in place and they in turn walk on the bowl-shaped floor with a sensor laden "waistband" that holds the user centered and detects velocity by sensing pressure on the inside of the waistband. Overall, the user experience of VIRTUIX OMNI could be fairly uncomfortable and far from natural walking experience due to special shoes, a "sensor/restraining waistband", and a bowl-shaped walking area. This is the opposite of the device in the present invention, in which the floor moves to keep the user centered. It provides a far superior, natural, and intuitive user experience that does not require low friction footwear that allows the feet to slip across the surface, be held in place by a waistband, or require the user to walk in a "bowl".

Thus, there is a recognized need for a device for interacting with a virtual reality environment, which is able to accurately simulate users' moving distance in every direction and does not limit the user's moving range. Particularly, the prior art is deficient in these aspects. The present invention fulfills this longstanding need and desire in the art.

SUMMARY OF THE INVENTION

The present invention is directed to a multi-functional moving floor device for interacting with virtual reality system comprising a body with a flat top surface; an enveloping skin; supporting structure, motorized and actuated control arms; sensors a control module; an action module; a wall module; a computing unit communicably connected with the control module, the action module, the wall module and the virtual reality system; means to activate and deactivate the device; and a power module.

The present invention is also directed to a user-interactive control device for interacting with a virtual reality system comprising an inner core; an outer flexible skin layer that wraps around the inner core; a lubricant layer located in a pressurized vacuum space between the outer flexible skin layer and the inner core; a plurality of ball bearings covering the entire core; a plurality of control arms; a plurality of weight sensors coupled with said control arms; a plurality of control spheres interfaced with the weight sensors; a plurality of "C-shaped" core receiver-support modules attached to the control arms in a supporting relationship with the core and a pinching relationship with outer skin of the core; at least three hydraulic actuators located on the bottom of the device; a rotating base holding the entire moving floor device; a rotatable ring-like extension stage for the inner core; a wall like structure embedded on top of the ring-like extension stage; a computing unit communicably connected to the weight sensors, control spheres, hydraulic actuators, rotating base, rotatable ring-like extension stage; means to activate and deactivate user-interactive control device; and a power module.

The present invention is also directed to a user-customized method for interacting with a virtual reality system, comprising the steps of activating the moving floor device described supra; connecting the moving floor device to the virtual reality device; determining the initial position of the user in the virtual reality environment; user-applying a movement or a series of movements on the upper surface of the moving floor device; generating signals based on the increased or decreased weight on each weight sensor; transmitting the signals from weight sensor to the computing unit; generating signals in the computing unit based on the signals from the weight sensors; transmitting the signals from computing unit to the virtual reality device and the control spheres; activating the wall-like structure and the ring-like extension stage as the distance between the user and the virtual wall like object becomes less than a predetermined value; deactivating the control spheres of moving floor portion of the device; user-walking to the wall-like structure; and deactivating the wall-like structure as the distance between the user and the virtual wall like object becomes greater than the predetermined value; and re-activating the control spheres of moving floor portion of the device.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 13A shows the pill-shaped design for the core. FIG. 13B shows the rotund metal core design.

FIG. 14A is the top view of the ball bearing. FIG. 14B is a cross-section view of the ball bearing.

FIG. 15 depicts a three-dimensional model of the core receiver-support system, which holds the edge of the core with the skin pinched between.

FIG. 16 depicts a side view illustration of the core receiver-support system, which holds the edge of the core with the skin pinched between.

FIG. 17A is the Pro Version with 12 core receiver-support arms. FIG. 17B depicts the "Gamer Version" of the device with 10 core receiver-support arms. FIG. 17C depicts the "virtual explorer version" of the device with 6 core receiver-support arms.

FIG. 21A is a perspective view of the moving floor device with symmetric pill-shaped design from a viewing angle slightly above the top surface of the device. FIG. 21B is a perspective view of the moving floor device with symmetric pill-shaped design from a viewing angle fully above the top surface of the device. FIG. 21C is a front view of the moving floor device with symmetric pill-shaped design. FIG. 21D is a top view of the moving floor device with symmetric pill-shaped design comprising a flat super ellipse shaped top surface. FIG. 21E is a perspective view of the moving floor device with symmetric pill-shaped design from a viewing angle slightly below the bottom surface of the device. FIG. 21F is a perspective view of the moving floor device with symmetric pill-shaped design from a viewing angle fully below the bottom surface of the device.

FIG. 22A shows a perspective view of the "C-shaped" core receiver-support module at a viewing angle slightly above the top surface of the device. FIG. 22B shows a perspective view of the "C-shaped" core receiver-support module at a viewing angle at the same level with the side surface of the device.

FIG. 23A depicts the user walking in a direction away from the single wall pictured directly behind her. FIG. 23B depicts that the core rotates beneath a user so that the wall is now in front of her. Alternatively the wall can be rotated in front of her, or both the floor and wall can rotate in tandem to insure the user is always facing the single wall. FIG. 23C depicts that a user simultaneously approaches a wall in a virtual reality environment at the same speed and direction as the real wall-like structure is directly in front of her. FIG. 23D depicts that the user is making contact with a wall in virtual reality at the simultaneous speed, direction, angle, and force as the real wall-like structure. This is facilitated by temporarily disabling the centering effect of the moving floor temporarily to allow the user to actually make contact with the wall.

DETAILED DESCRIPTION OF THE INVENTION

Figure 1:
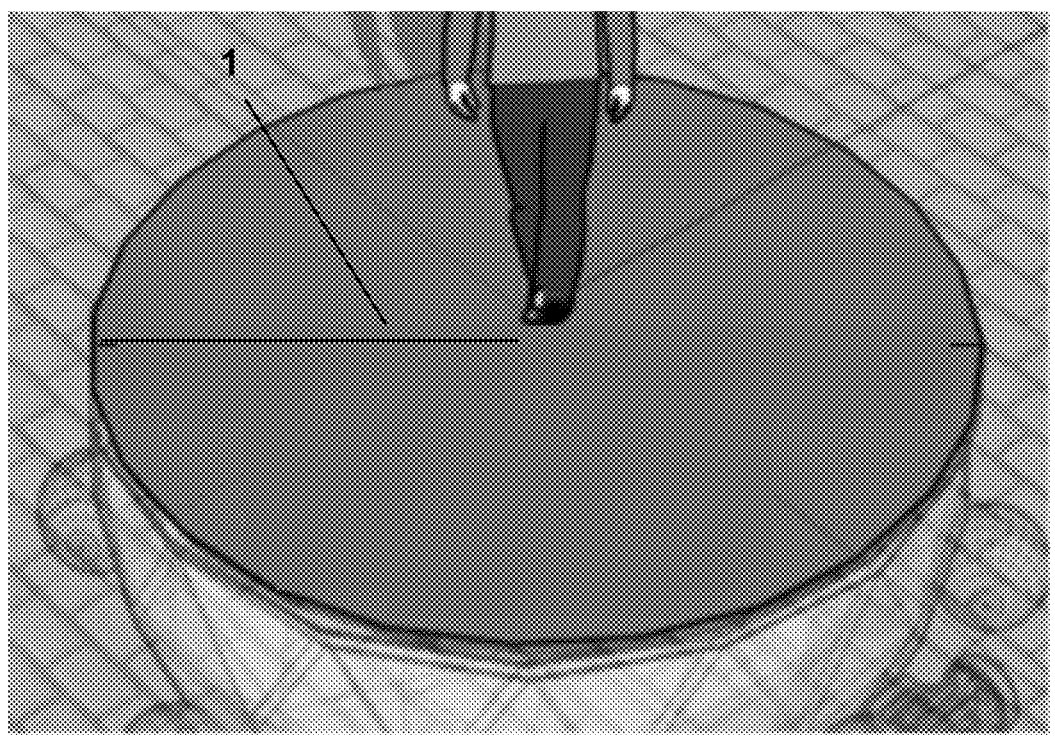
FIG. 1 is a top view of the moving floor device used for interacting with virtual reality environment with a user standing on the top surface illustrating the pressure changes when the user steps from the center toward the edge of the surface.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the term "pinching configuration" refers to a configuration, in which the ball control directly presses the outside surface of the outer flexible skin and the rollers of control sphere directly press the inside surface of the outer flexible skin, and the ball press against the rollers of the control sphere with the outer flexible skin between them.

As used herein, the term "top surface" refers to the flat surface of the hemispherical shaped moving floor device, which is in direct contact with a user thereof. As used herein, the term "bottom surface" refers to the hemispherical surface (i.e. dome-like surface) of the moving floor device. As used herein, the term "distal end" refers to the end of the bottom surface that is away from the top surface.

As used herein, the term "gear driven system" refers to a mechanical configuration that comprises a drive gear, i.e., the gear directly connected to a variable speed multi direction electric motor.

In one embodiment of the present invention, there is provided a moving floor device for interacting with a virtual reality system, comprising a body with a flat top surface; a control module; an action module; a wall module; a computing unit communicably connected with the control module, the action module, the wall module and the virtual reality system; means to activate and deactivate the device; and a power module.

In this embodiment, the flat surface of the body is in direct contact with a user's feet of the moving floor device. The body comprises an inner core with a flat top surface; an outer flexible skin layer that wraps around the inner core; and a lubricant and/or a ball bearing layer located in a pressurized vacuum space between the outer flexible skin layer and the inner core.

In one aspect of this embodiment, the inner core has a rotund design, comprising a flat top surface and a rotund bottom surface. The inner core with rotund design is filled with heavy metal at the bottom thereof to increase the weight and stability of the device and create a pendulum effect. In this aspect of the embodiment, the outer skin is stretched around the core. In another aspect of this embodiment, the inner core has a symmetrical pill-shaped design, comprising a flat top-surface, a flat bottom-surface and a curved side surface. In this aspect of the embodiment, the outer skin is non-stretched.

In this embodiment, the outer flexible skin comprises a smooth inner layer that is in direct contact with the lubricant layer of the device; an outer layer with a rough surface that is in direct contact with the bottom of a user's foot; a mesh layer attached underneath the outer layer; and a center layer filled with non-Newtonian liquid. Preferably, the lubricant layer is a non-Newtonian fluid selected from high-grade motor oil, grease, ball bearings or a combination thereof.

In this embodiment, representative examples of the material that the outer flexible skin of the device is made of include but are not limited to Neoprene, 100% rubber or latex. In the symmetrical pill-shaped design, the outer flexible skin of the device comprises a non-stretchable material in a configuration of a conveyor belt. In one aspect of this embodiment, a plurality of concave dimples is located on the surface of the core of the device to reduce friction between outer flexible skin and the core. Each dimple is substantially circular with a diameter of about 0.3 inches to 6 inches. In another aspect of this embodiment, the surface of the core has a plurality of convex ball bearings embedded thereon to reduce the friction between outer flexible skin and the core. The density of the ball bearings on the core surface is from about 8 medium sized ball bearings per square foot to about 36 small sized ball bearings per square foot. Different parts of the core may have ball bearings of different sizes with various densities on the core surface. The diameter of each ball bearing is from about ⅛ inch to about 3 inches.

In this embodiment, the control module comprises a plurality of control arms; a plurality of weight sensors; a plurality of core receiver-support modules; and a plurality of control spheres that moves the outer flexible outer skin of the device. Preferably, the control arm comprises a base, an arm, a shock absorber and/or and mechanical or pneumatic actuator, and a tip consisting of a ball joint or similar connector. Attached to this ball joint or connector can be a powered or unpowered core receiver-support module, a neutral support sphere or wheel, or a powered support and drive sphere or wheel. The core receiver-support module comprises a "C-shaped body" with an inside curve covered with both powered and unpowered control spheres and or a plurality of neutral ball bearings. The powered control spheres may retract or disengage when not needed leaving only a neutral support present upon and on the skin. The powered control spheres on the inside of the "C shape" can pull the skin in and push it out to prevent wrinkling. In a second manner or in conjunction, a plurality of openings on the end comprising motors and powered control spheres push and pull the outer skin in and out the curve to move the outer skin within the inside curve without wrinkling it. In a preferred embodiment, either the powered control spheres or wheels retract when not needed leaving only neutral support spheres, or alternatively the control spheres become neutral and not cause drag when power is not needed. This is needed to account for the vortex created at corners of non-circular core shapes.

In this embodiment, the control arms are attached to a circular metal bar to form a cradle. The cradle is disposed on the distal end of the moving floor device to support the moving floor device. The control arms are supported by a spring-loaded or hydraulic shock absorption system, actuators and integrated weight sensors. In this embodiment, the core receiver-supports grip both the top surface and the bottom surface of the inner core with the symmetrical pill-shaped design.

In this embodiment, the weight sensors transmit the increase or decrease of the weight applied thereon to the computing unit. The control sphere is in a-ball-in-a-cup configuration, comprising a spherical cup; a ball inside the spherical cup; at least three rollers attached to the wall of the cup that physically turns the ball inside the cup in 360 degrees in any direction; and at least one variable speed electric motor coupled with each roller. In a preferred embodiment, the ball of the control sphere is in direct contact with the outside surface of the outer flexible skin. At least three control spheres or wheels or core receiver-support modules are used to facilitate the movement of the outer skin in all directions about and around the core. The core mounted rollers and/or ball bearings and the external ball of the control sphere, control wheel, or core receiver-support module are in pinching configuration. The pinching configuration consist of the inside ball pinching the skin against the external ball with the skin tightly squeezed between them in order to provide grip under powered movement. The control spheres are spherical shaped wheels that move the outer flexible skin in any direction. The control spheres are disposed at the circumference of the top surface of the inner core and/or along the inside center curve or ends of the core receiver-support modules.

In this embodiment, the action module comprises at least three hydraulic actuators located on the bottom of the device and a rotating base holding the entire moving floor device. At least two of the hydraulic actuators are located on the northeast and southeast corner of the device, and at least one hydraulic actuator is located on the west direction of the device. The rotating base comprises a gear driven system and a variable speed multi direction electric motor that propel the entire device to rotate. In this embodiment, the action module is configured to generate motions of rolling, tilting, swiveling, shaking, rotating or a combination thereof for the device. The action module is also configured to maintain the user facing the same direction.

In this embodiment, the wall module comprises a ring-like extension stage, at least one wall-like structure located on at least one side of the extension stage, a driving element, an interface that connects the wall module with the hemispherical body and the virtual reality device. In a preferred embodiment, the ring-like shape that is configured as a substantially concentric structure located around the hemispherical body of the device. The wall module with a single wall-like structure located on one side of the hemispherical body is configured to simulate wall-like obstacles in every direction in a virtual environment.

In this embodiment, the computing unit comprises at least one processor and memory. In a preferred embodiment, the computing unit further comprises an interface communicably connects the computing unit to a virtual reality device. The virtual reality device is selected from virtual reality glasses, a game console, a computer, a smart phone, a tablet or a dome structured virtual reality screen.

In this embodiment, the means to activate and deactivate the device are gesture activated switches, voice recognition or remote control from a smart electronic device. In a preferred embodiment, the gesture is at least one predetermined motion applied on the top surface of the moving floor device. The predetermined motion is selected from walking, jumping, sliding, crawling or a combination thereof. The top surface of the moving floor device can be substantially super ellipse to maximize the distance to the edge of any user walking in the center of this shape while still being curved at edges.

In another preferred embodiment of the present invention, there is provided a user-interactive control device for interacting with a virtual reality system, comprising an inner core; an outer flexible skin layer that wraps around the inner core; a lubricant layer located in a pressurized vacuum space between the outer flexible skin layer and the inner core; a plurality of control arms; a plurality of weight sensors coupled with the control arms; a plurality of "C-shaped" core receiver-support modules attached to the control arms in a supporting relationship with the core and a pinching relationship with outer skin of the core; a plurality of control spheres interfaced with the weight sensors; at least three hydraulic actuators located on the bottom of the device; a rotating base holding the entire moving floor device; a rotatable ring-like extension stage for the inner core; a wall like structure embedded on top of the ring-like extension stage; a computing unit communicably connected to said weight sensors, control spheres, hydraulic actuators, rotating base, and rotatable ring-like extension stage; means to activate and deactivate user-interactive control device; and a power module.

In one aspect of this embodiment, the inner core has a rotund design with a flat top surface and a rotund bottom surface. In this aspect, the bottom of the inner core is filled with heavy metal such as lead to increase the weight and stability to the device. In this aspect of the embodiment, the outer flexible skin is stretchable. In another aspect of this embodiment, the inner core of the device has a symmetrical pill-shaped design with a flat top-surface and a flat bottom-surface, and the outer flexible skin of the device comprises a non-stretchable material in a configuration of a conveyor belt.

In one aspect of this embodiment, a plurality of concave dimples is located on the surface of said core to reduce the friction between outer flexible skin and the core. Each dimple is substantially circular with a diameter about 0.3 inches to 6 inches.

In an alternative aspect of this embodiment, the surface of the core of the device has a plurality of convex ball bearings located thereon to reduce the friction between outer flexible skin and the core. In this embodiment, the lubricant or ball bearing layer may located in the pressurized vacuum space between the outer flexible skin layer and the inner core. The diameter of each convex ball bearing is from about ⅛ inch to about 3 inches.

In this embodiment, the outer flexible skin comprises a smooth inner layer that is in direct contact with the lubricant layer of the device; an outer layer with a rough surface that is in direct contact with the bottom of a user's foot; a mesh layer attached underneath the outer layer; and a center layer filled with non-Newtonian liquid. In this embodiment, the lubricant layer is a non-Newtonian fluid selected from high-grade motor oil, grease, ball bearings or a combination thereof.

In this embodiment, the control arm comprises a tip, a base, an arm, an electric motor, a shock absorber, a mechanical or pneumatic actuator, a powered or unpowered control sphere or wheel. In this embodiment, the core receiver-support module comprises a C-shaped body with a inside curve covered with ball bearings; a plurality of openings on the end comprising motors and drives move the outer skin in and out of the curve; and a compartment containing electric motors and sensors configured to move the outer skin within the inside curve without wrinkling it.

In one aspect of this embodiment, the control arms are attached to a circular metal bar to form a cradle. The cradle is disposed on the distal end of the moving floor device to support the user-interactive control device. In an alternative aspect of this embodiment, for the inner core with the symmetrical pill-shaped design, the core receiver-supports grip both the top surface and the bottom surface of the core. The control arms are supported by a spring-loaded or hydraulic shock absorption system and integrated weight sensors. The weight sensors transmit the increase or decrease of the weight applied thereon to the computing unit.

In this embodiment, the control sphere is in a-ball-in-a-cup configuration, comprising a spherical cup; a ball inside the spherical cup; at least three roller attached to the wall of the cup that physically turns the ball inside the cup in 360 degrees in any direction; and at least one variable speed electric motor coupled with each roller.

In this embodiment, the ball of the control sphere is in direct contact with the outside surface of the outer flexible skin. The at least three rollers of the control sphere are disposed inside the outer flexible skin and in direct contact with the inside surface of the outer flexible skin. The rollers and the ball of the control sphere may be in a pinching configuration. In this embodiment, the control spheres can be spherical shaped wheels that move the outer flexible skin in any direction. The control spheres are disposed at the circumference of the top surface of the inner core on the bottom surface of the device.

In this embodiment, at least two of the hydraulic actuators are located on the northeast and southeast corner of the device, and at least one of the hydraulic actuator is located on the west direction of the moving floor device. The rotating base comprises a gear driven system and a variable speed multi direction electric motor that propel the entire device to rotate. The hydraulic actuators are triggered by the virtual reality device. The hydraulic actuators and rotating base are configured to generate motions of rolling, tilting, swiveling, shaking, rotating or a combination thereof for the device. In this embodiment, the hydraulic actuators and rotating base are configured to maintain the user facing the same direction.

In this embodiment, the rotatable ring-like extension stage for the inner core comprises a driving element that interfaces with the computing unit and virtual reality device and propel the rotating motion of the extension stage. The ring-like extension stage is configured as a substantially concentric structure located around the substantially hemispherical inner core of the device.

In this embodiment, the computing unit comprises at least one processor and memory. The computing unit further comprises an interface communicably connects the computing unit to a virtual reality device. Representative virtual reality devices include but are not limited to virtual reality glasses, game consoles, a computer, a smart phone, a tablet or a dome structured virtual reality screen.

In this embodiment, representative means to activate and deactivate the device include but are not limited to gesture activated switches, voice recognition, or remote control from a smart electronic device. The gesture is at least one predetermined motion applied on the top surface of the user-interactive control device. The top surface of the device can be substantially super ellipse to maximize the distance to the edge of any user walking in the center of this shape while still being curved at edges.

In yet another embodiment of the present invention, there is provided a user-customized method for interacting with virtual reality, comprising the steps of activating the moving floor device described supra; connecting the moving floor device to the virtual reality device; determining the initial position of the user in the virtual reality environment; user-applying a movement or a series of movements on the upper surface of the moving floor device; generating signals based on the increased or decreased weight on each weight sensor; transmitting the signals from weight sensor to the computing unit; generating signals in the computing unit based on the signals from the weight sensors; transmitting the signals from computing unit to the virtual reality device and the control spheres; triggering the motor in the control spheres to move the outer flexible skin in the opposite direction to the user's movement for the same distance with the same velocity as the user's movement; changing the user's position in the virtual reality environment based on the signal from the computing unit; user-approaching a virtual wall-like object in the virtual environment; activating the wall-like structure in the wall accessory portion as the distance between the user and the virtual wall like object becomes less than a predetermined value; deactivating the control spheres of moving floor portion of the device; user-walking to the wall-like structure; deactivating the wall-like structure as the distance between the user and the virtual wall like object becomes greater than the predetermined value and re-activating the control spheres of moving floor portion of the device. In this embodiment, the predetermined distance between the user and the virtual wall-like object in the virtual environment is about 3 feet.

In this embodiment, the user-applied movement comprises running, crawling, jumping, walking, or any combination thereof.

Figure 5:
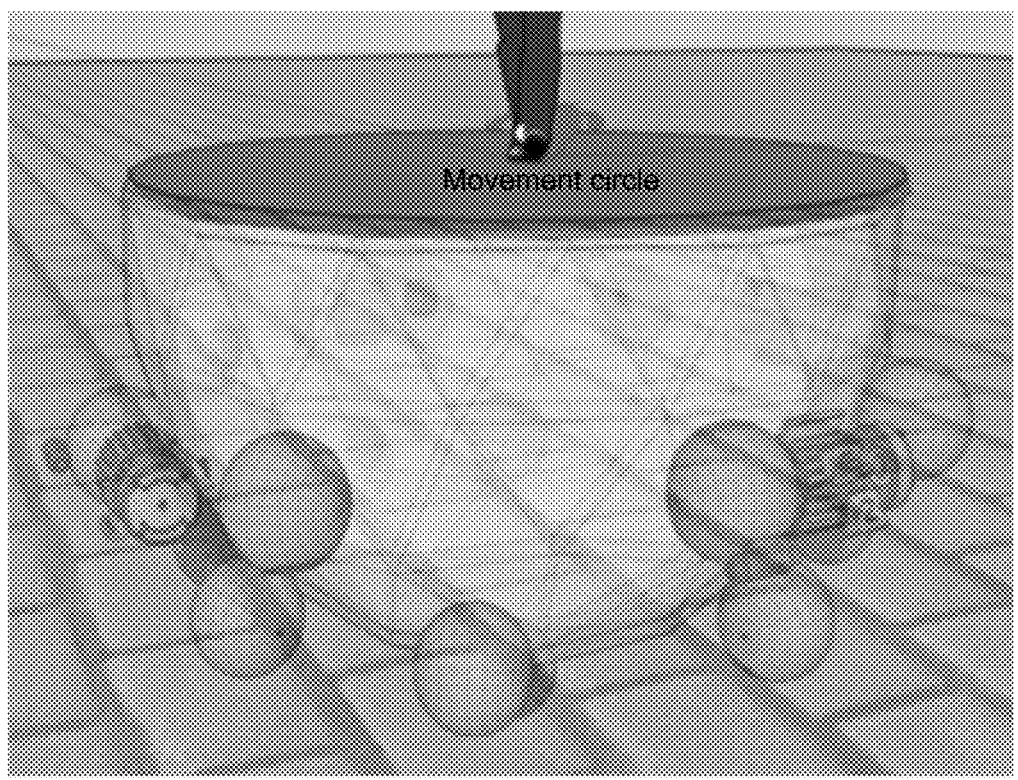
FIG. 5 is a perspective view of the moving floor device with the weight sensor, multivariable speed motor and control spheres attached on the side surface. A few control spheres are located on the bottom of the device to support the entire core. A plurality of control spheres are located on the bottom of the device to support the entire core.

The "Moving Floor Device" keeps the user centered in a "movement circle" (FIG. 5) by moving the floor beneath the user in the opposite direction and at the same speed as the user runs, crawls, jumps, or walks over the surface. This device uses no harnesses of any kind and the user is kept centered by the weight they place on the surface being used to find their position, and moving the floor beneath them.

In FIG. 1, the user enters the center of the circle with the device off. The user turns on or off the moving floor by jumping up and down or stepping in a preset number of ways and or patterns, or pressing a smartwatch button, or by using an app on a phone, or a voice command, or by tapping on his/her VR headset. Upon activation of the unit it becomes sensitive to weight distribution as it corresponds to the center of the "movement circle" the person is standing on. If a person walks away from the center of the circle, the Inner Solid Core will shift on its balanced centerpoint in the direction the person is walking. This will in turn apply pressure (FIG. 1) to the "weight sensors" (located equidistant around the points of a circle; described below).

Figure 4:
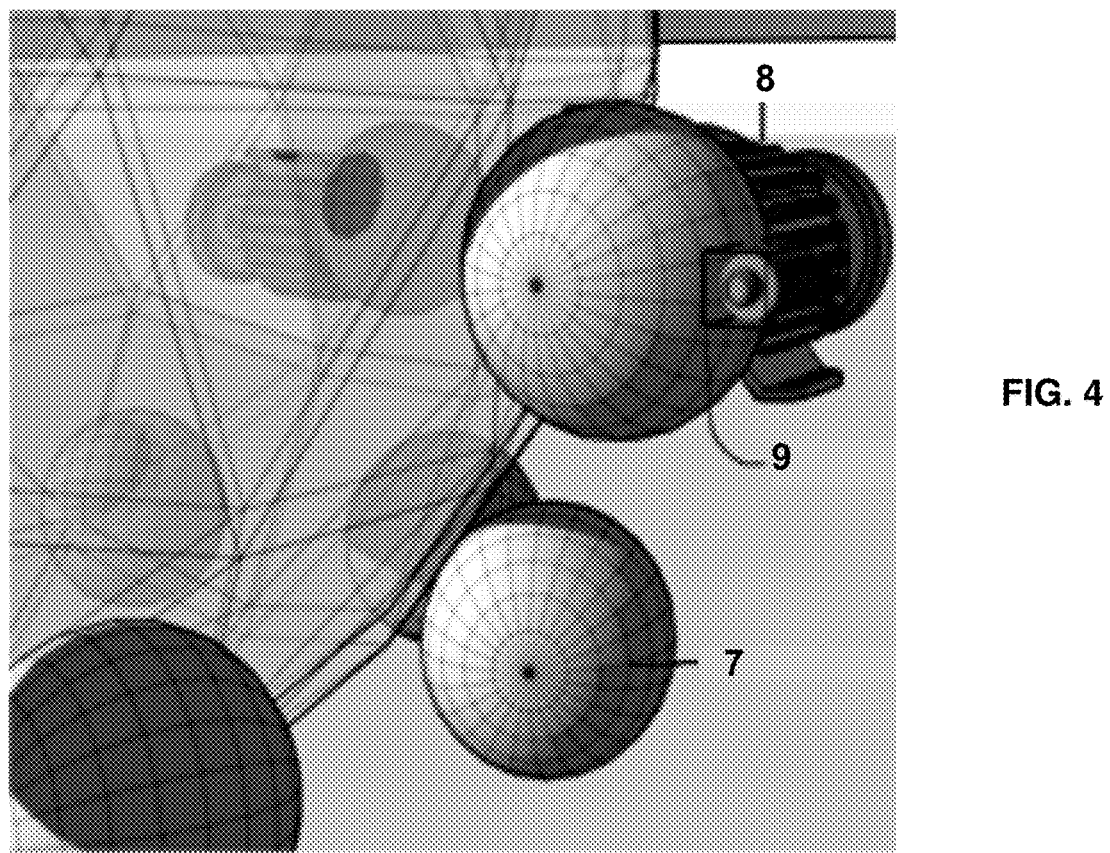
FIG. 4 is a perspective view of the weight sensor, multivariable speed motor and control spheres.
Figure 7:
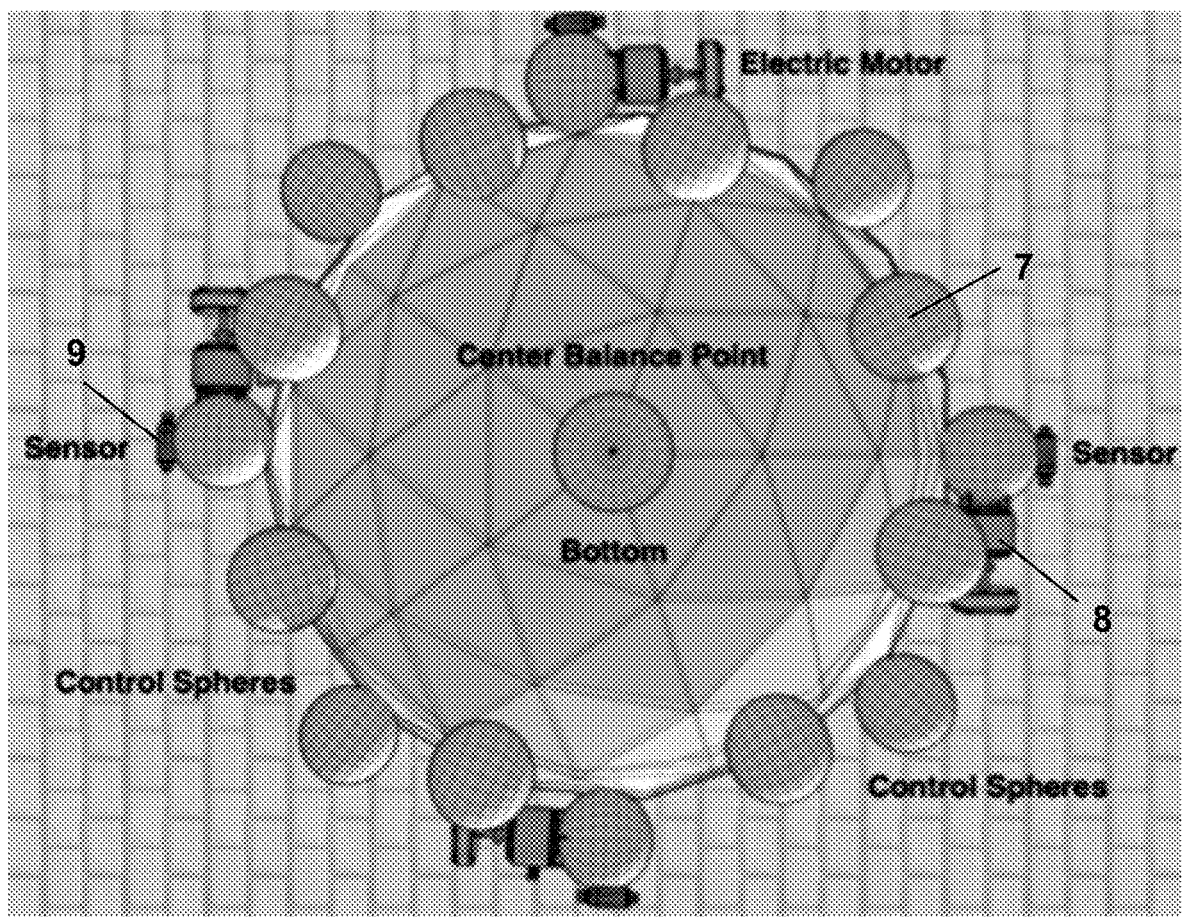
FIG. 7 is a bottom view of the moving floor device depicting the center balance point and the positions of weight sensor, multivariable speed motor and control spheres. There is only one control sphere located on the center balance point of the device.
Figure 8:
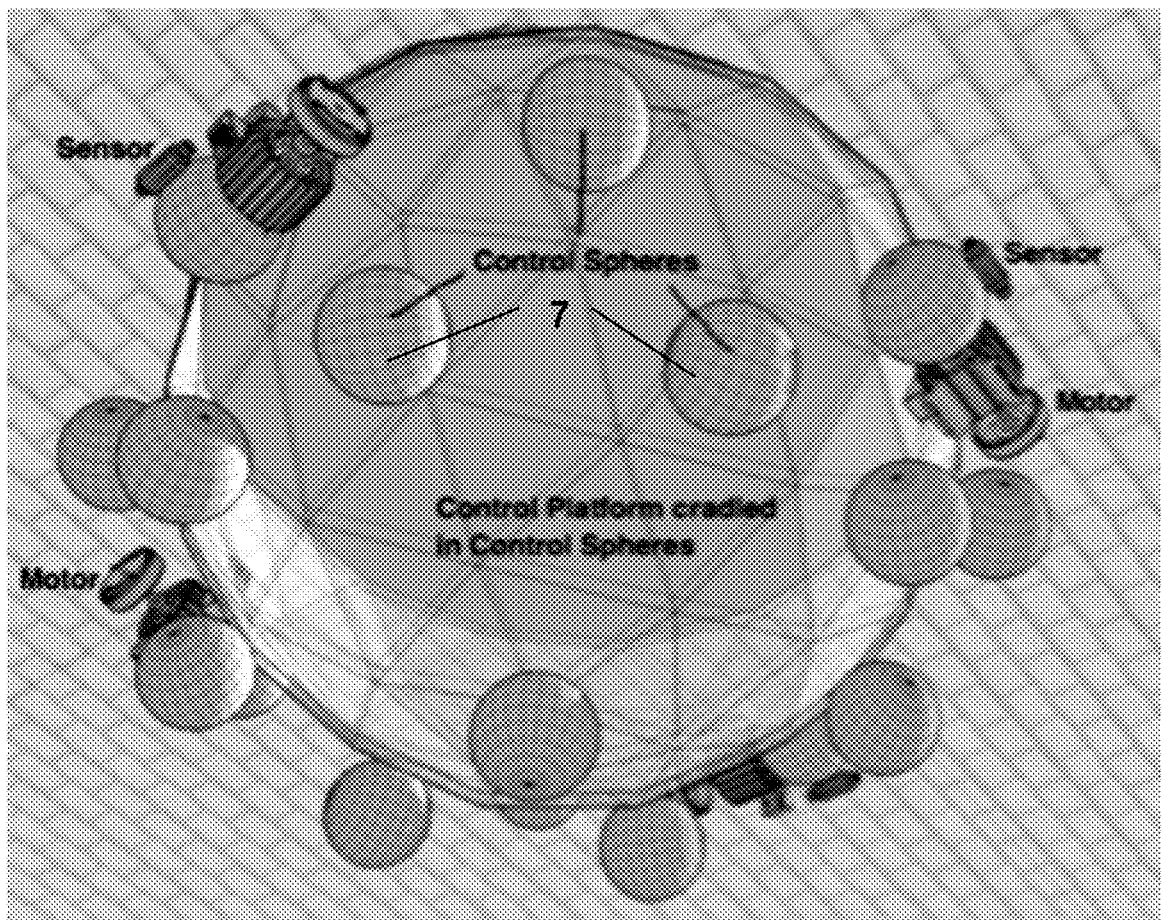
FIG. 8 is a bottom view of the moving floor device depicting the center balance point and the positions of weight sensor, multivariable speed motor and control spheres. There are multiple, optimally at least three control spheres located around the center balance point of the moving floor device.

In the Weight Sensor(s) (as depicted in FIGS. 4 and 7-8) the person walking toward will receive a positive weight reading, and the sensors walked away from will receive a negative weight reading. Based on the amount of positive/negative weight, the sensors will activate and control the direction of travel of the control spheres supporting the center core. Weight distribution controls the direction and speed the control spheres move. If a positive weight is detected, the control ball rolls in the same direction as the person walking toward that sensor, in turn moving the floor in the opposite direction of the person walking toward that sensor. If a negative weight is detected, the control ball rolls in the opposite direction as the person walking away from it, in turn moving the floor in the same direction as the person walking away from the sensor. The combination of all sensors and all control balls working together to move the outer flexible skin around the inner core and creates the ability to keep a person centered within the "movement circle radius" (FIG. 1). No matter which direction they crawl, walk, or run they will act upon one or more "sensor, motor, & control ball" supporting arms (FIG. 4) which will work together in unison to provide 360 degrees of fluid motion movement within the circle. The sensation will feel completely natural to the user because the surface is flat, and there is no harness.

The device detects jumps when a weight is detected on all of the weight sensors at one time (FIG. 7) as the user lands. The direction of the jump is calculated by comparing the variation of positive and negative weight readings of sensors when the jump was detected and correlating the landing spot from those readings. The "floor" can also be moved on purpose via the control spheres 7 and motors 8 (FIG. 4) without the input of the user, but rather input from the game or simulation to simulate virtual environmental effects (i.e. shaking the floor beneath the user to simulate a grenade). The device may also have sensors and direction control spheres mounted both on top and below the inner core so as to provide more control for these effects. The actual production device may have inner core shapes that are less tall, or more rounded, or have a symmetrical semi-spherical edge (pill shape), as long as the shape of the inner core produces a flat surface on top for which a user may travel and the system can detect off center weight in the shape used.

Components and Assembly

Figure 2:
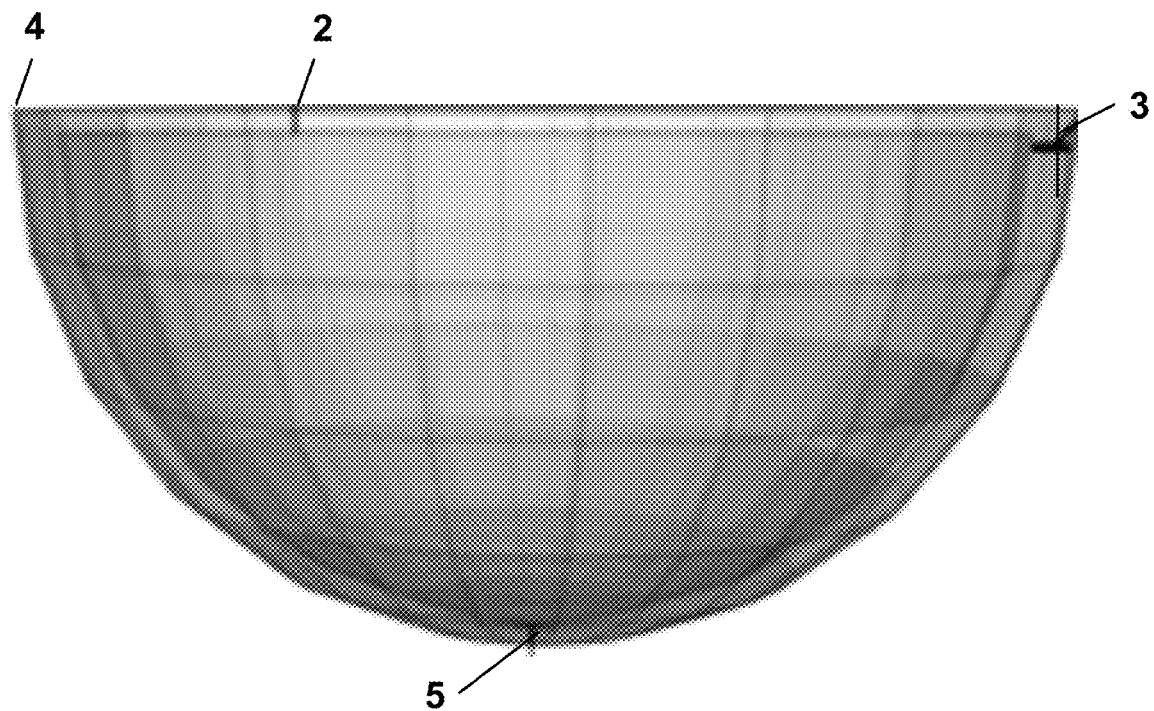
FIG. 2 is a cross-sectional view from the side of the moving floor device, depicting the outer flexible skin layer, the lubricant layer, the inner solid core and the center balance point.

The "Control Platform" is the assembled sum of the Inner Core 2, the separating Lubricant 3, and Outer Flexible Skin 4 as one unit (FIG. 2). It is supported by the Control Spheres directly and the Control Arms or a Cradle indirectly (FIG. 8). Overall, depicts that the consumer ready moving floor device comprises four major components: 1) core 2 covered with ball bearings; 2) outer skin 4; 3) support base and arms 14 (shown in cutaway); 4) enclosure 15 where the support base and arms and enclosure comprise the stage.

The Inner Core

Figure 13A:
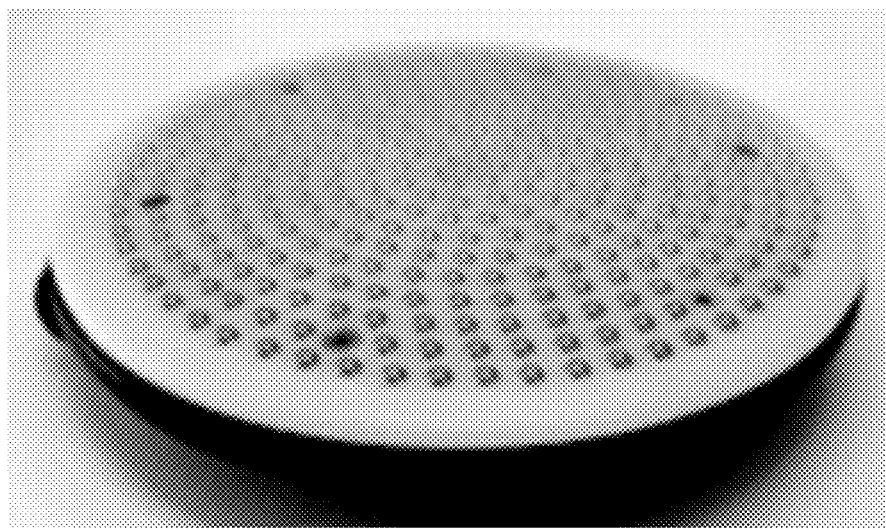
FIGS. 13A-13B depict the two types of designs for the core of the moving floor device.
Figure 13B:
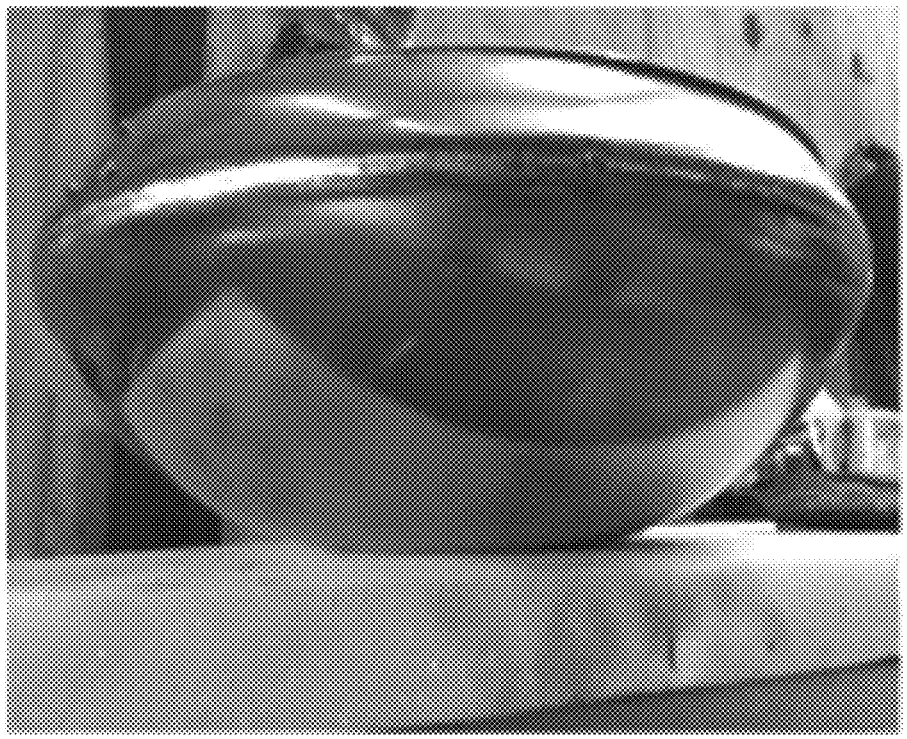
Figure 19:
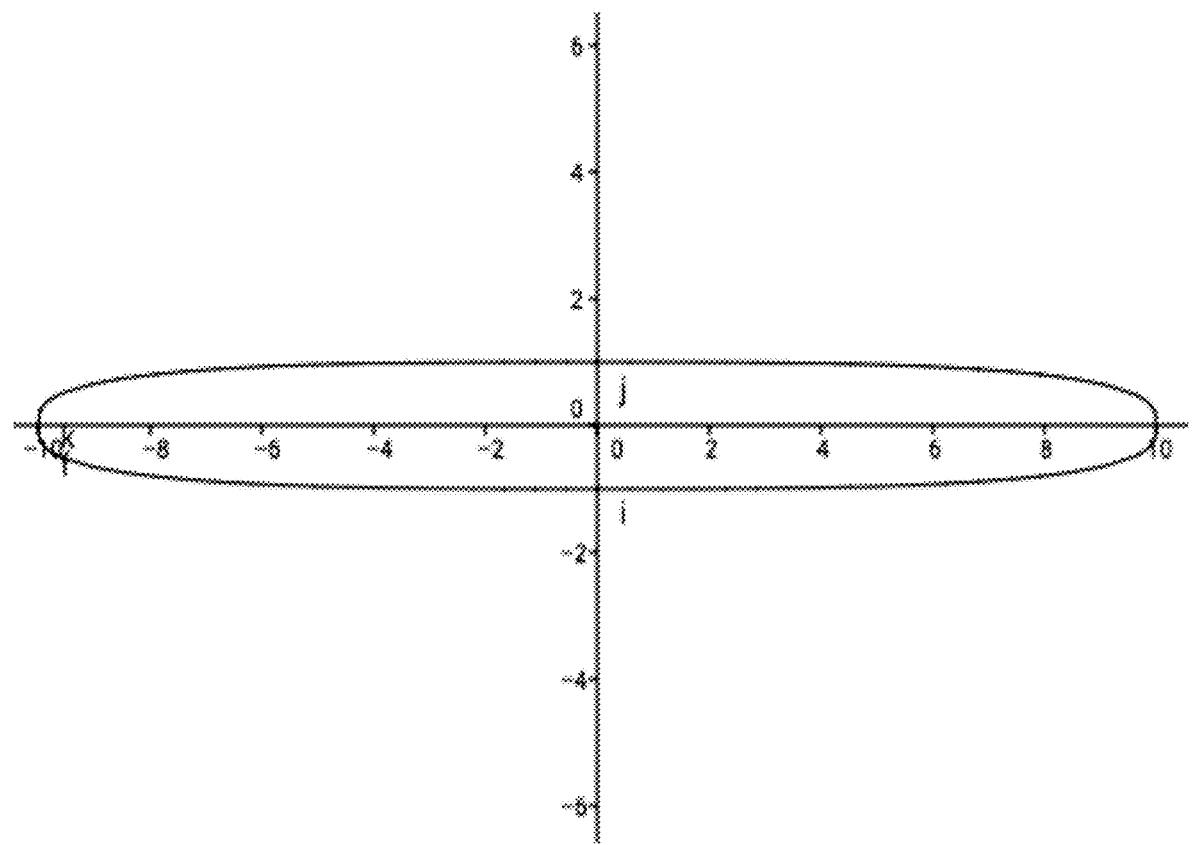
FIG. 19 depicts a side view of the core with a symmetrical pill-shaped design. All four quadrants of the core are symmetrical. The outer skin for this core does not have to stretch at any point, since all 4 quadrants of the core are the same shape and volume. The core can be a circle or square shape or any variant in between, so long as it is entirely symmetrical.

The "Inner Core" is the solid, hard, weighted core at the very center of the moving floor device. There are two types of design for the configuration of the core. The first one is solid and rotund as shown in FIG. 13B. The second design is symmetrical pill-shaped configuration (FIGS. 13A and 15-16) comprising a flat top surface, a flat bottom surface and a curved side surface as shown in FIG. 13A. The core can be assembled with two halves adjoined by six or more anchoring points. This design eliminates having to have skin stretched at different extent as it traverses the core. This prevents wrinkling or tight spots found in cores that are not symmetrical (FIG. 19).

Figure 14A:
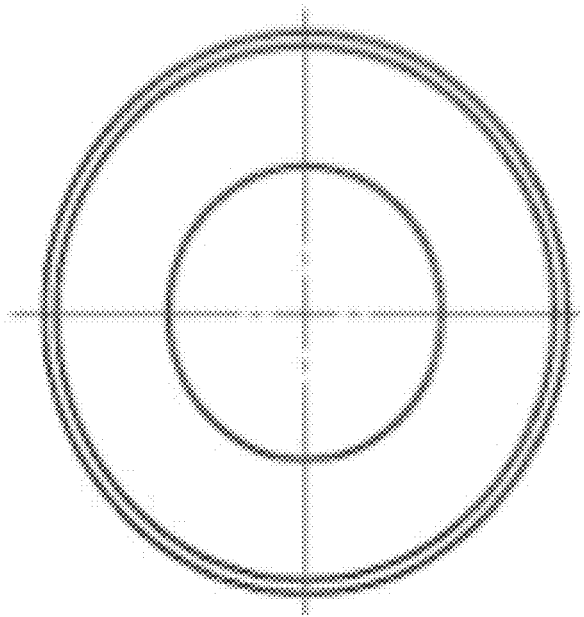
FIGS. 14A-14B depict the structure of the ball bearings embedded on the surface of the core of the device.
Figure 14B:
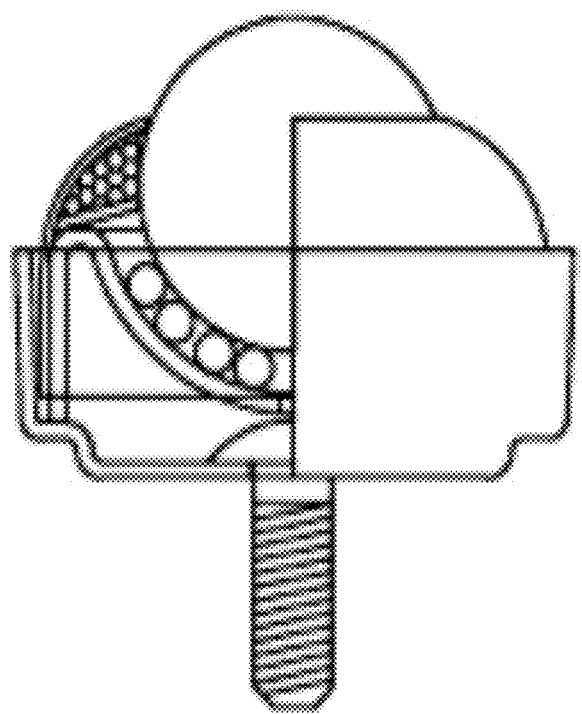

In both designs, ball bearings are embedded on the surface of the core, providing the needed lubrication between the outer skin and the core. The structure of the ball bearing comprises a ball structure, a ball holder, a plurality of small beads between the ball structure and the holder and a screw to fix the ball bearings on the core (FIGS. 14A-14B). The ball bearings are attached from the inside of the core (FIGS. 14A-14B), with only the ball structure exposed to the lubricant and outer flexible skin. The density of the ball bearings is determined by the maximum density of ball bearings that is needed while still maintaining structural integrity with a 400 lb load on top. The core is completely covered by ball bearings. The edge around the circumference of the walking area (top surface) uses bigger ball bearings than those at other parts of the core.

For the solid and rotund design, the core needs to be heavy enough so that it stands stable in a cradle that is created by a support base and control arms. In this configuration, the core can be filled with heavy metals such as lead at the bottom. It creates a pendulum effect to aid the action module and provides enough counter pull to keep the core from rotating when the outer flexible skin is in motion.

For the symmetrical pill-shaped design, the top surface of the core is covered by a metal sheet, which can be selected from 0.060 to 0.125 inch chrome moly, stainless steel or aluminum sheet or other suitable weight bearing materials. The top and bottom halves are adjoined using flush mounted metal screws, allowing the access to install the ball bearings from the inside of the metal sheet prior to assembling the two halves. "Core Receiver and Support Module" (FIGS. 15-16) control arms are used to hold both the top and the bottom of the core. Extra weight is not necessary in this configuration. The core should be slick with no protrusions or any other hindering structures. The edges of the flat core should be rounded symmetrically to reduce friction between the outer flexible skin and the core and so a flexible skin is not needed.

Figure 6:
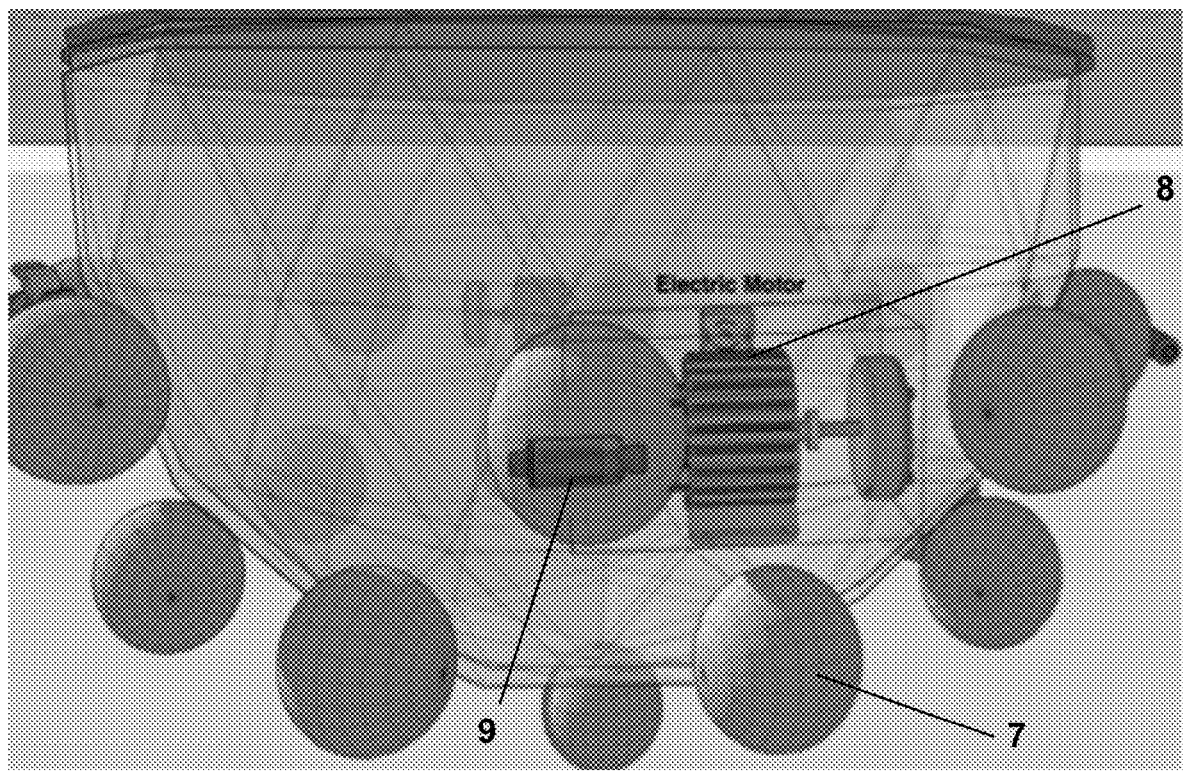
FIG. 6 is a perspective view of the lower part of the moving floor device focusing on the relative positions of weight sensor, multivariable speed motor and control spheres.

The core is separated from the "Outer Flexible Skin" by the "Lubricant" or by "Ball Bearings" mounted directly to the entire surface of the core. The downward weight of the inner core or the "C shaped" core receiver-support modules keeps the core flat when control spheres act on the outer flexible skin. Additionally, when control spheres are added to both top and bottom of the Inner Core (FIG. 6), the inner core can be kept horizontal regardless of the weight or shape of the inner core. Additionally, when the floor shakes or is tilted, this holds the sphere in its grip.

The weight, the gripping action, and/or top surface control spheres surrounding the inner core will keep the "Control Platform" from coming out of the bowl that is created by the control arms and the spheres at the end of them which directly contact the flexible outer skin. Additionally, control spheres may also be placed on top of the Control Platform along and pressing down on the top edge of the "Movement Circle", to further aid in stability and safety.

The Inner Core is always shaped so that it has a center balance and a flat surface on top for the user to walk in. Weight distribution is transmitted to the weight sensors 9 in two methods. The first method is off center tilt detection. The second method is by comparing the positive and negative weight on each of the sensors around the edge of the movement circle and comparing the differences. Using these two methods the users velocity and direction may be established instantly.

Figure 18:
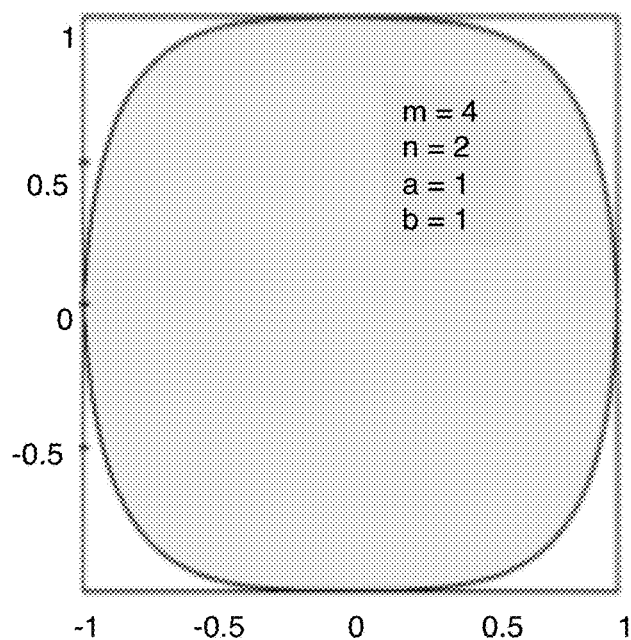
FIG. 18 depicts the walking area of the moving floor device with a shape called "Super Ellipse Movement Area". This shape maximizes the distance to the edge of any user walking in the center of this shape while still being curved at edges.

The Inner Core shapes may range in size and dimensions, being shaped like a skipping stone or a lens, and may have a slight convex or concave shape on the top, bottom, or sides in order to decrease friction with the outer flexible skin. Along the edge of the "movement circle radius" 1 (FIG. 1), on the Inner Core the surface is either rounded, indented, or have protruding roller balls 6 (FIG. 3) or ball bearings are attached to decrease friction at the edges. The ball bearings can either be mounted on the core with the roller balls facing the skin, or the ball bearings may be embedded in the skin with the roller balls facing the core. The top surface (walking surface) of the device may be substantially super ellipse (FIG. 18). In a given space, this shape will maximize the distance to the edge of any user walking in the center of this shape while still being curved at edges.

The Lubricant

Figure 3:
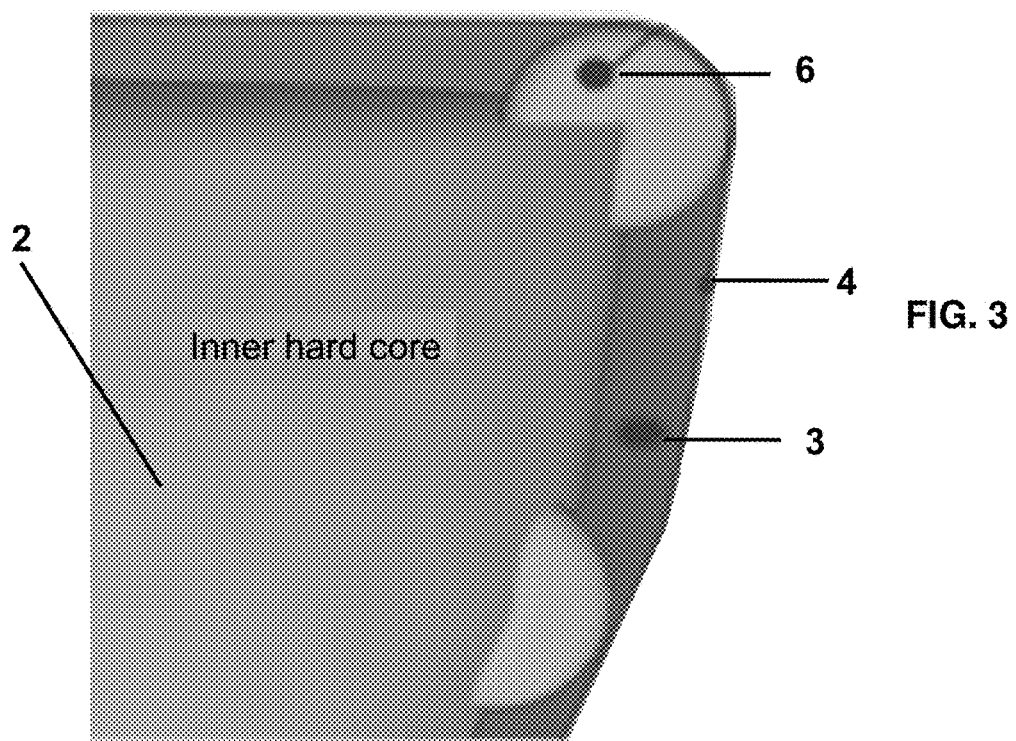
FIG. 3 is a cross-sectional view of the upper edge part of the moving floor device depicting the roller balls of the controller spheres are located around the edge between the outer flexible skin and the inner core of the upper surface of the device.

The lubricant 3 exists in a pressurized vacuum between the outer flexible skin and the inner core (FIGS. 2-3). Its purpose is to decrease friction between the outer flexible skin and the inner core. Some of the possible candidates for this include non-Newtonian fluids of all kinds, as well as more common ingredients like high-grade motor oil, grease, ball bearings or other industrial lubricants. The advantage and purpose of using non-newtonian fluids is that the lubricant would remain in liquid form until it is stepped on, then it would turn hard due to the pressure. The nature of non-newtonian liquids is that they turn hard under pressure or weight. This would provide a liquid grade lubricant and an "on demand" method of turning the ground hard wherever a user steps. By putting the lubricant under a high amount of pressure (PSI), this would also increase the hardness of the "ground" without changing the flexibility or lubrication properties of the lubricant liquid. Air under heavy pressure may also be used in place of liquid. The lubricant may be made to glow when put under pressure.

The Flexible Outer Skin

The "Flexible Outer Skin" is wrapped tightly around the "Inner Core" and the "Lubricant" separates the outer flexible skin from the inner core. As the "Control Spheres" roll in unison, the outer flexible skin moves around the inner core with the aid of the lubricant.

The Flexible Outer Skin may be made up of several layers. The inside of the skin is made slick and as frictionless as possible. Small dimples on the inside may aid in this. The outside of the Flexible Outer Skin is made to provide grip to the bottom of the user's foot and to last. It may comprise a core material of Neoprene coated by rubber or latex both inside and out side. The Flexible Outer Skin is designed to stretch slightly, both in and out, to accommodate for the different positions and the forces they exert that may exist as it rotates around the center core. The Flexible Outer Skin may have a center layer filled with non-newtonian liquid or other liquid.

The Control Arms

The control arm comprises a base, an arm, a shock absorber and/or and mechanical or pneumatic actuator, and a tip consisting of a ball joint or similar connector. Attached to this ball joint or connector can be a powered or unpowered core receiver-support system, a neutral support sphere or wheel, or a powered support and drive sphere or wheel.

Figure 9:
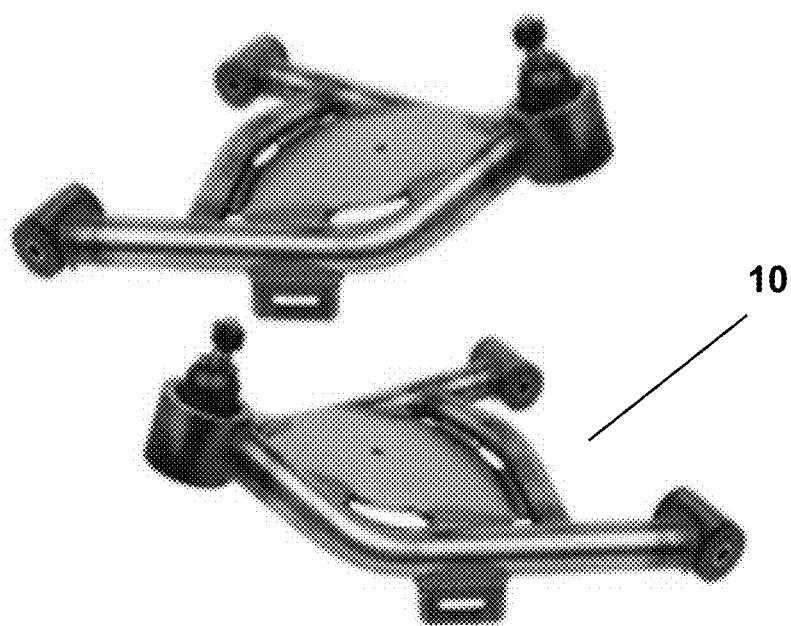
FIG. 9 shows images of the control arms of the moving floor device.

The "Control Arms" 10 have both integrated weight sensors and control spheres mounted on the singular tip of the arm (FIG. 9). For the core with rotund design, the control arms are arranged around the bottom of core to provide support for the entire device. The Control arms are all attached to a single circular metal bar. The more arms there are, the less friction each arm bears. The Control Arms may be supported by a spring loaded or hydraulic shock absorption system 16 and integrated weight sensors (FIGS. 21A-21F). As a person walks in any direction these arms will move providing a measurement of positive or negative force. The Control Arms may be moved up and down by a motorized force to simulate virtual environmental situations, such as an explosion.

Figure 15:
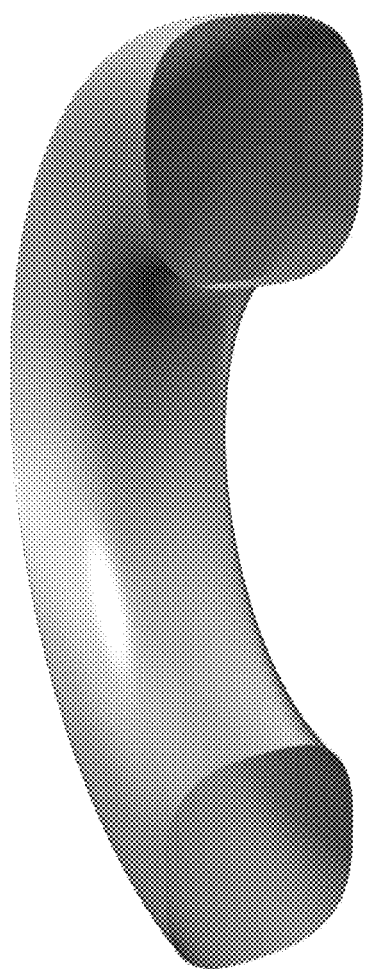
Figure 16:
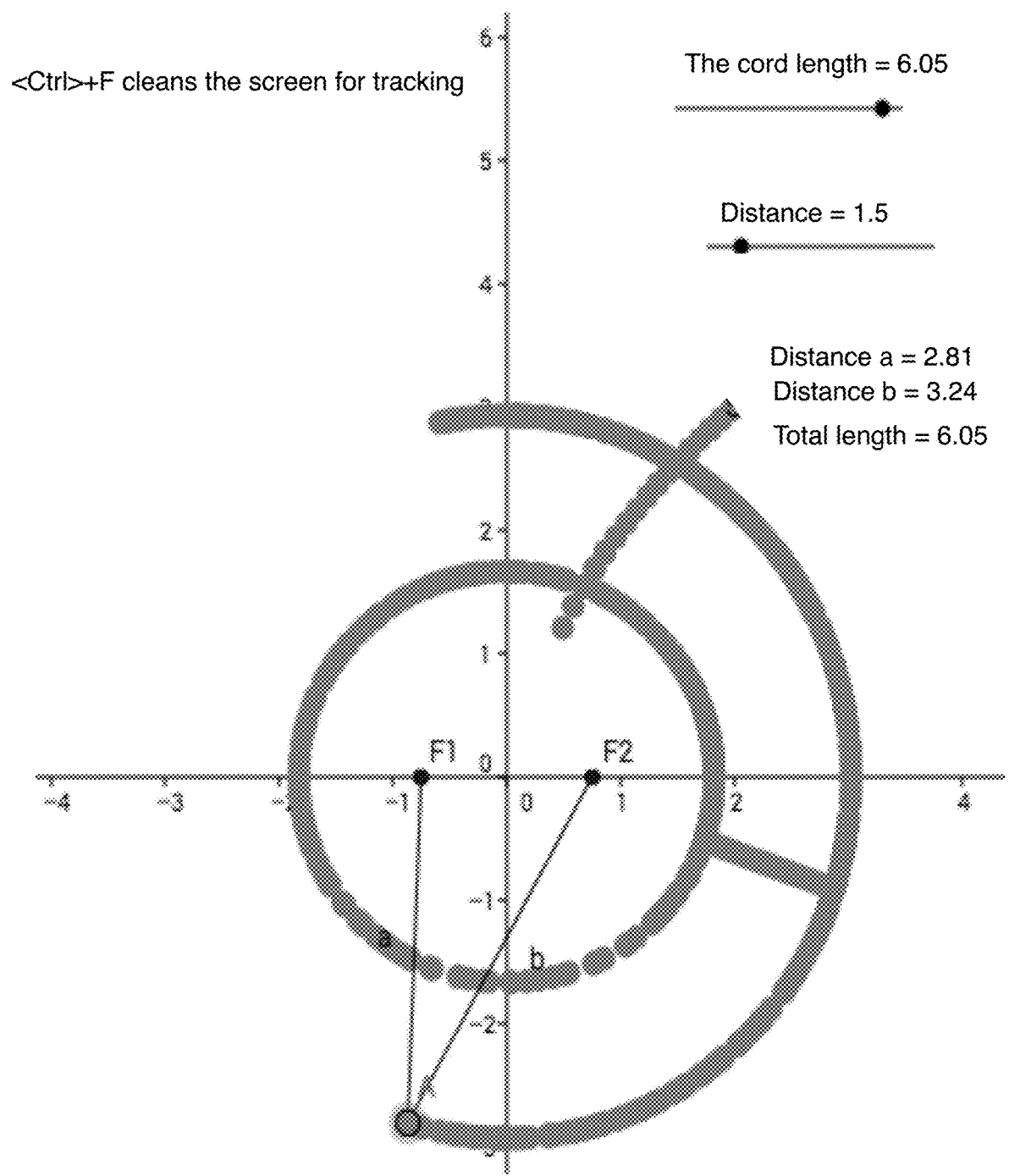

Control arms with "wishbone" design are used for the core with the symmetrical pill-shaped design (FIGS. 15-16). The wishbone designed arms hold on both of the top and the bottom of the core. Each arm is responsible for supporting and moving the skin for its own slice of the walking area. It uses the rollers at the end of each finger with pinching technique to hold each slice up and flatten out the wrinkles of the outer flexible skin. When a movement is activated, a motorized track roller is deployed and engages the outer flexible skin and moves it. When the movement of the slice of skin is no longer activated, the motorized track roller retracts. A plurality of wishbone designed control arms work in conjunction to support the core off the ground. By moving these control arms up and down, it simulates slops and pitches in the virtual reality environment. The control arms can also simulate the shaking motion of the ground by moving up and down with high frequency.

Core Receiver-Support Module

Figure 22A:
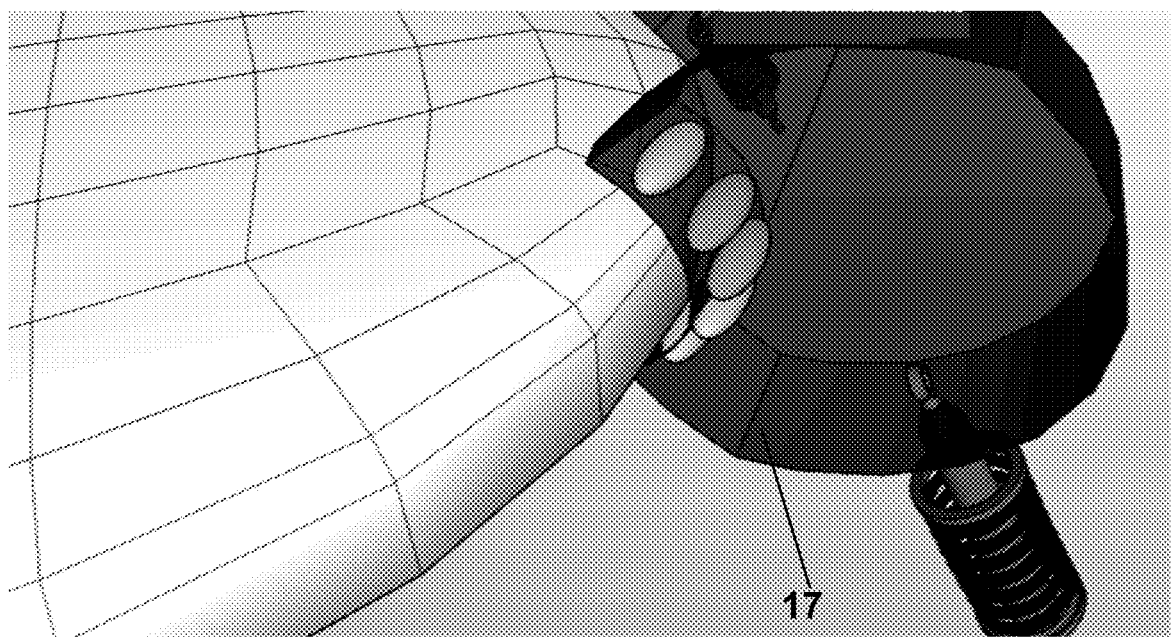
FIGS. 22A-22B depict the "C-shaped" core receiver-support module in a gripping relationship with the symmetric pill-shaped core on the top and bottom surfaces of the device. The "C-shaped" core receiver-support module comprises a motor compartment for containing electric motors and sensors therein.
Figure 22B:
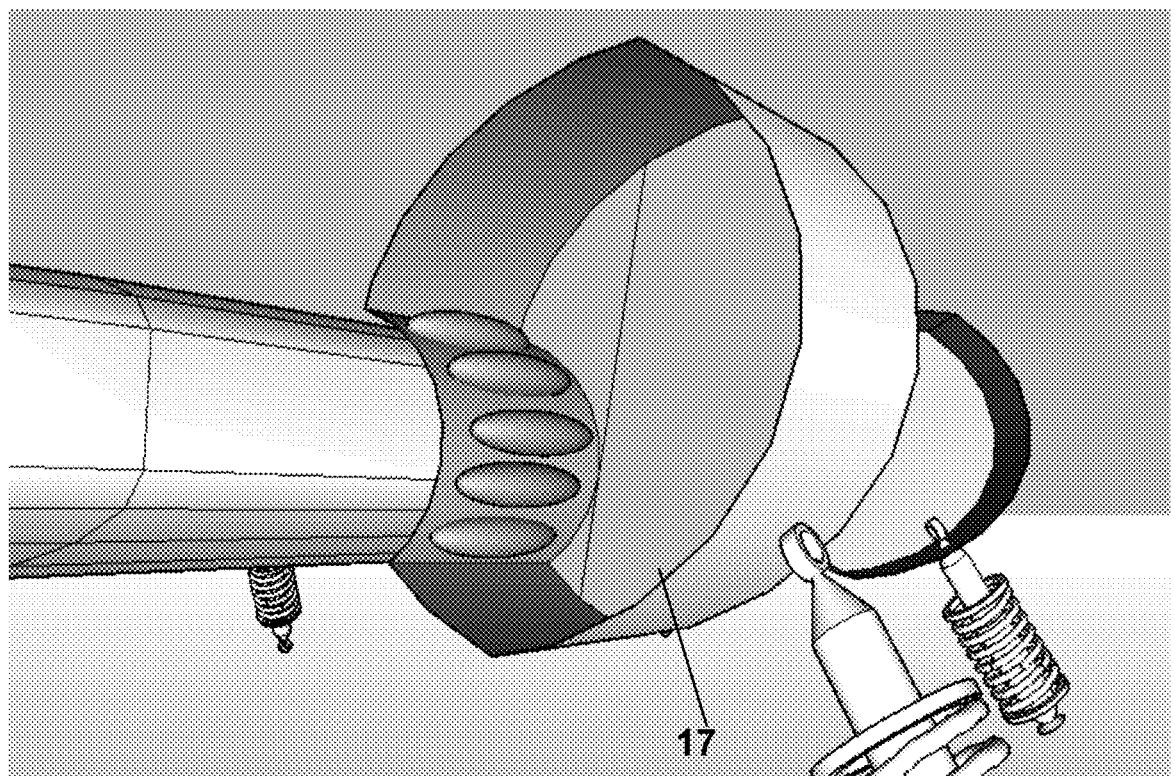

The core receiver-support module comprises a "C-shaped body" with a inside curve covered with ball bearings; a plurality of openings on the end and along the inside curve of the "C-shaped body" comprising control spheres or wheels to move the outer skin in and out the curve. The motors that drive the control spheres are stored in a compartment just behind the control spheres or wheels and are responsible for providing the means to turn the control spheres. The electric motors may drive directly the control spheres or wheels, and they also may transfer 360 degree motion via a ball-in-cup control sphere along the inside curve of the "C-shaped body" (FIGS. 22A-22B).

These core receiver-and support 17 (FIGS. 15-16 and 22A-22B) is aligned around the points of a circle (as shown in FIGS. 17A-17C and 21A-21F) and supported off the ground by motorized hydraulic shock absorbers which can also act as actuators. These actuators can tilt and yaw, rotate, shake, elevate, lower, or face the user true north. These core receiver-supports may both support and grip the core (FIGS. 22A-22B). Because the core receiver-support modules directly oppose one another they will keep the core level. Both positive and negative weight distribution off center maybe measured by the weight on the shock absorber/actuator that is supporting the core receiver-supports. By rotating the ring on which all of the core receiver-supports rest on allows for rotation of the core 360 degrees. Additionally there may be wheels that engage horizontally at the center of the "C-shaped" core receiver-support modules, whose sole purpose is to rotate the core laterally.

Figure 17A:
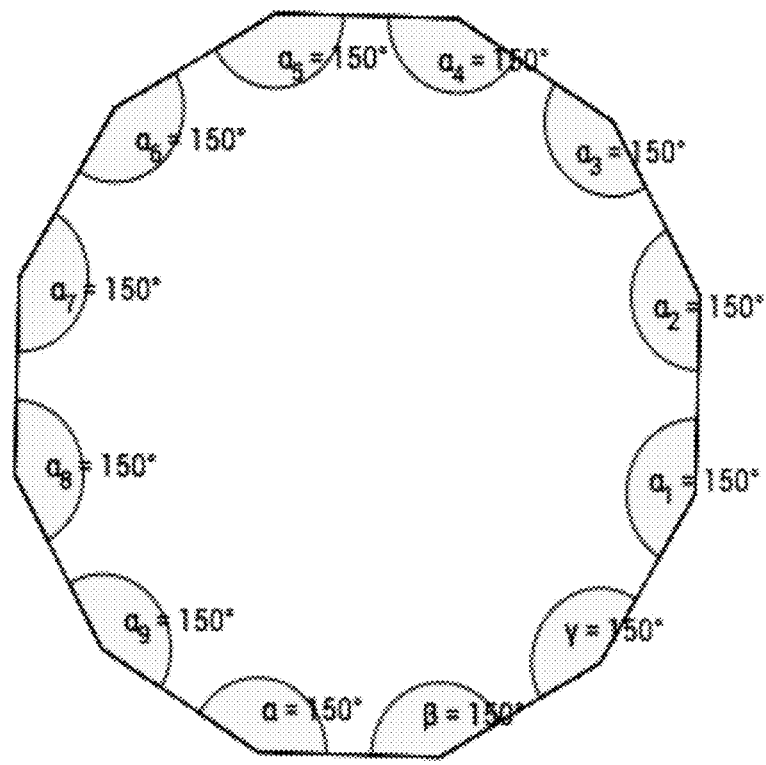
FIGS. 17A-17C depict placement of core receiver-supports on three different versions of the device. They are in order from largest and most powerful to smallest and least expensive.
Figure 17B:
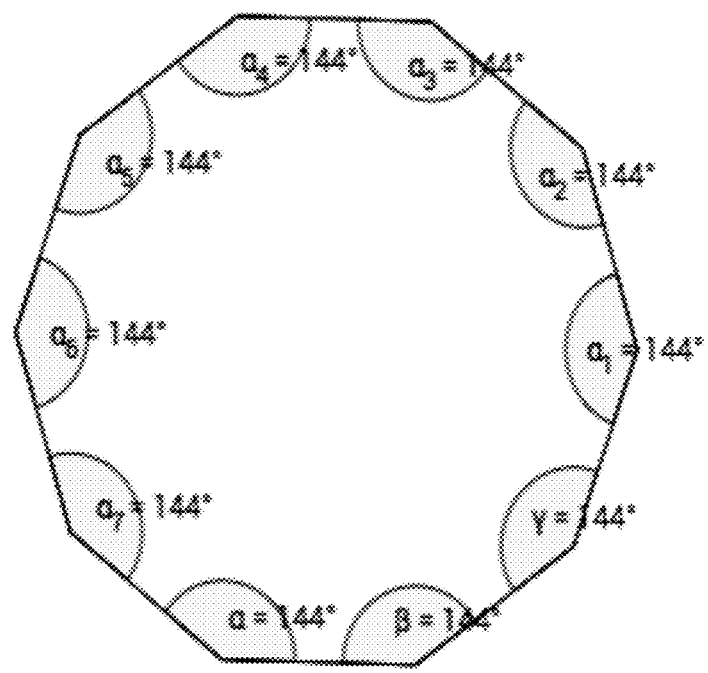
Figure 17C:
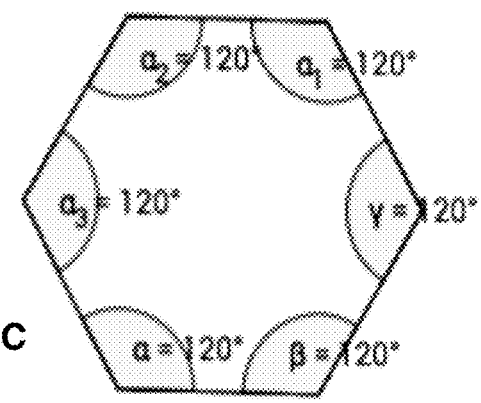

The sizes of the core and the responsive accuracy of the device determine the placement of the control arms along with the core receiver-supports, around the core. FIG. 17A is depicts the Pro Version of the device with 12 core receiver-support attached control arms. Of the three versions, this is the most responsive model to the user's actions applied on top of the device, sensing actions such as running and jumping on a flat surface with an 8 feet diameter. This version may further comprise the module for haptic feedback, rotation, and/or wall module. FIG. 17B depicts the "Gamer Version" of the device with 10 core receiver-support attached control arms. It can sense actions such as jogging and hopping on a flat surface with a 6 feet diameter. This version may further comprise the module for haptic feedback, rotation, and/or a wall module. FIG. 17C depicts the "virtual explorer version" of the device with 6 core receiver-support attached control arms. It can capture walking action on a flat surface with a 4 feet diameter.

The Weight Sensors

Located at the base or tip or integrated into the Control Arms, these pressure sensors (FIGS. 4 and 7-8) measure and transmit the positive and negative weight they sense as the user moves around the "movement circle". As the person stands in the center of the "Movement Circle", all sensors are neutral, in other words, sensing 0 lbs positive or negative weight. As the user moves away from the center, the sensors he/she is moving toward shows an increase (positive) weight. The sensors the person is moving away from show a decrease (negative) weight. The Weight Sensors transmit these positive and negative readings to the Input/Output Control Box so that the CPU can determine the velocity of the user. These sensors work by measuring how much the arm moves up and down or by the weight put on the tip of the arm connecting the Control Sphere.

The Control Spheres

Figure 10:
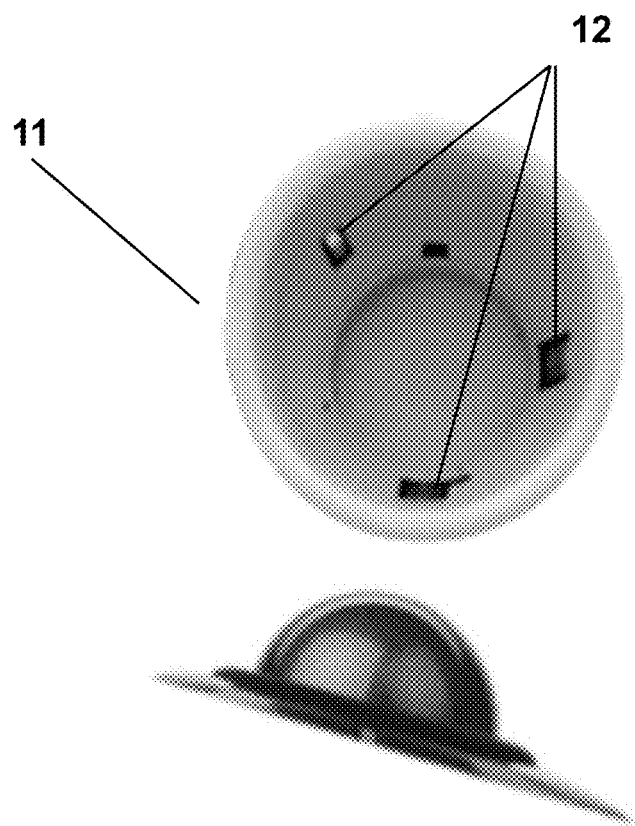
FIG. 10 shows the two parts structure of the control sphere comprising an outer cup part and a ball that resides inside the outer cup. There are three rollers in the wall of the outer cup part, which controls the rolling direction and speed of the ball.

The Control Spheres consist of a ball in a cup design 11 (FIG. 10) and a sphere design (FIG. 4). Inside the Ball and Cup design there are three rollers 12 attached to three variable speed electric motors (FIG. 10). These motors can spin the ball inside the cup in 360 degrees. It is very much like the reverse of a trackball mouse. Unlike a trackball mouse the rollers are used to direct the trackball, instead of the trackball rolling the wheels at the bottom of the cup. By applying power to the rollers in the cup, the ball within the cup can rotate 360 degrees and by making contact with the Outer Flexible Skin, and can move the Outer Flexible Skin around the Inner Solid Core by using the friction between the ball and the outside of the skin (designed for grip) to cause the skin to revolve the Inner Solid Core in a controllable manner.

The second design for Control Spheres is wheels in the shape of spheres. If enough Control Spheres are used, 360 degree movement may not be a requirement and normal wheels or bearings may suffice. The system may use both ball and cup, wheels and spheres to control movement and support weight in any combination or for the best use fitted.

The third design for control spheres to provide both powered and unpowered support and movement of the skin around the core that is gripped by the core receiver-support modules. The control spheres that are fitted to the end of control arms, which can simultaneously pull and push the outer skin of the core around the core from both the top and bottom of the C-shaped design, using the motors affixed at each end or along the inside of the "C" shape. This is key in making the skin move about the core without wrinkling.

It may be that only one very large Control Sphere may be mounted at the dead bottom center balance point 5 of the Control Sphere which will handle all powered movement of the Flexible Outer Skin, and that the rest of the supporting rollers be only for support and suspension. The Control Spheres may use a pinching technique with rollers on the inside of the Outer Flexible Skin to increase grip.

On the inside curve of the "C shape" of the core receiver-support there may be both powered and unpowered control spheres. Either the powered control spheres or wheels will retract when not needed leaving only neutral support spheres, or alternatively the control spheres become neutral and not cause drag when power is not needed. This feature is essential to account for the vortex created at corners of non-circular core shapes.

The Control Sphere Electric Motors

The Electric Motors provide the mechanical power to move the outer flexible skin around the inner core as directed to do so by the CPU. There are two kinds of control sphere, "direct drive" and "ball in a cup". The electrical variable speed motors directly drive the sphere in a "direct drive" control sphere as specifically depicted in FIG. 6 and also are also depicted in FIGS. 4 and 7-8. In a "Ball and Cup" Control Sphere, the electric drive motors are located in the bottom of the cup (see FIG. 10).

The Stage

Figure 20:
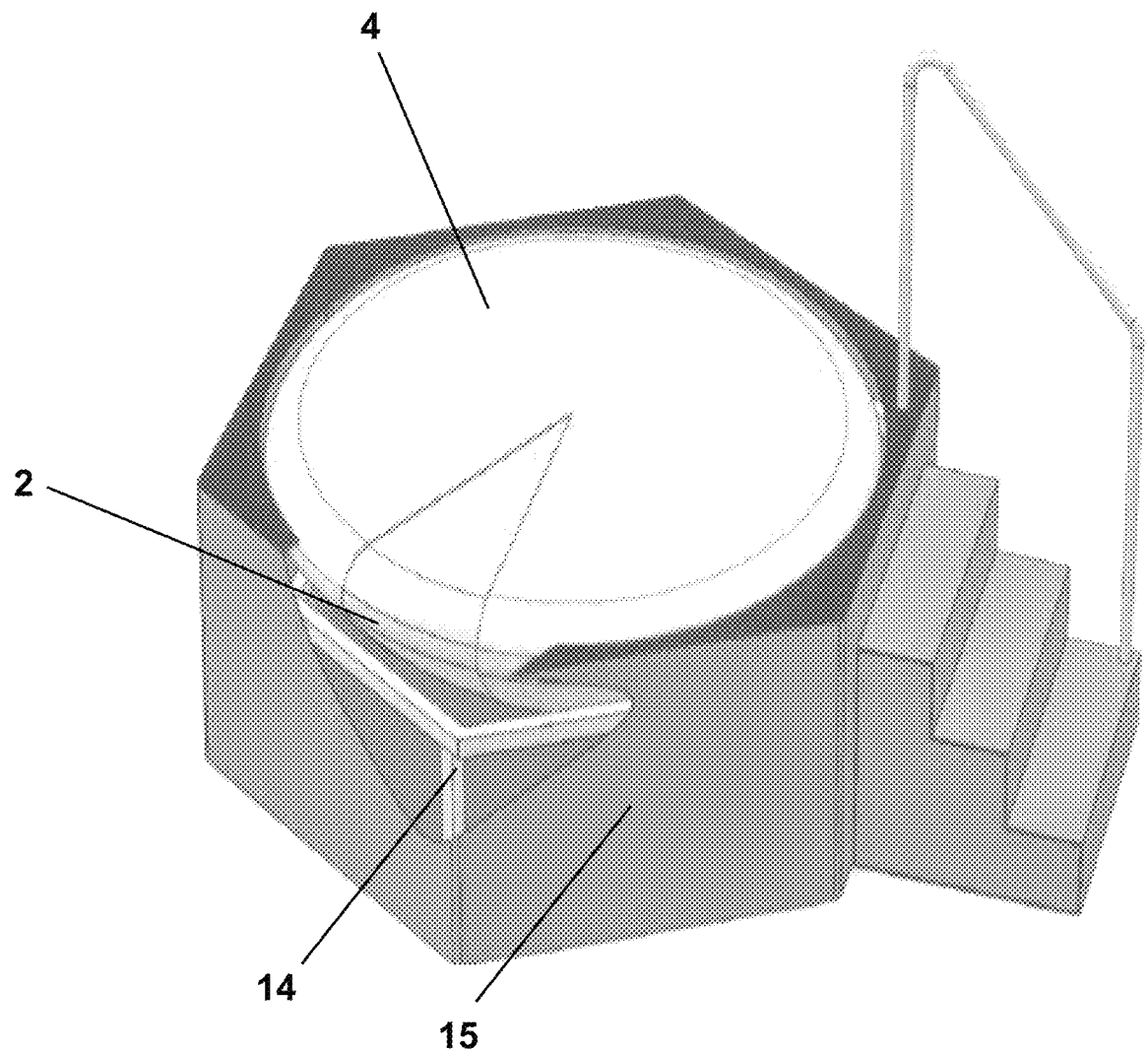
FIG. 20 depicts the consumer ready moving floor device comprising four major components: 1) core covered with ball bearings; 2) outer skin; 3) support base and arms (shown in cutaway); 4) enclosure.
Figure 21A:
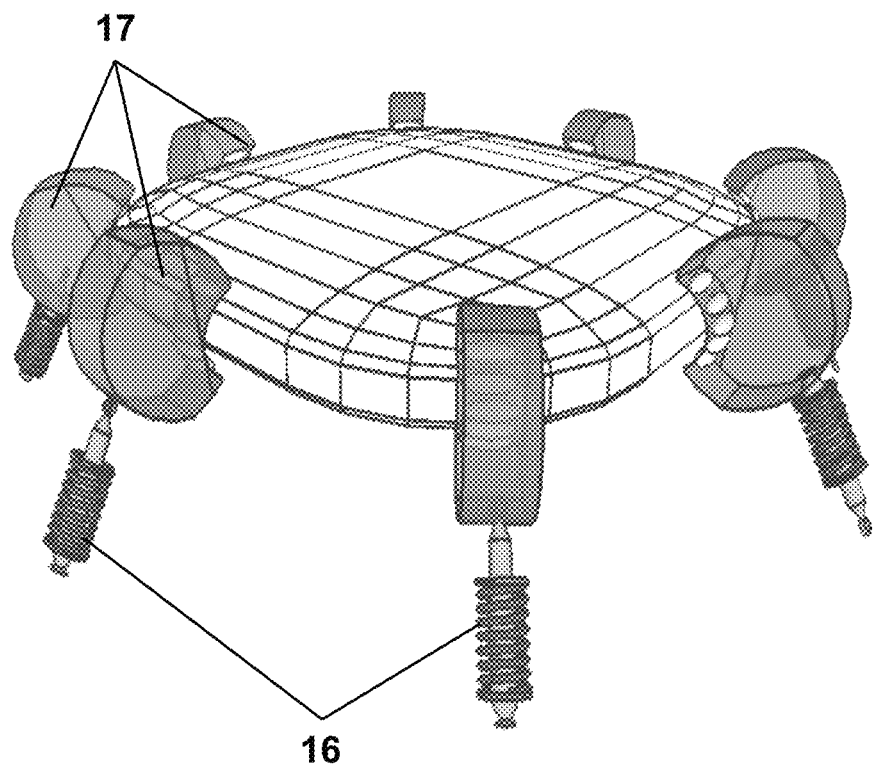
FIGS. 21A-21F depict different views of the moving floor device with symmetric pill-shaped design.
Figure 21B:
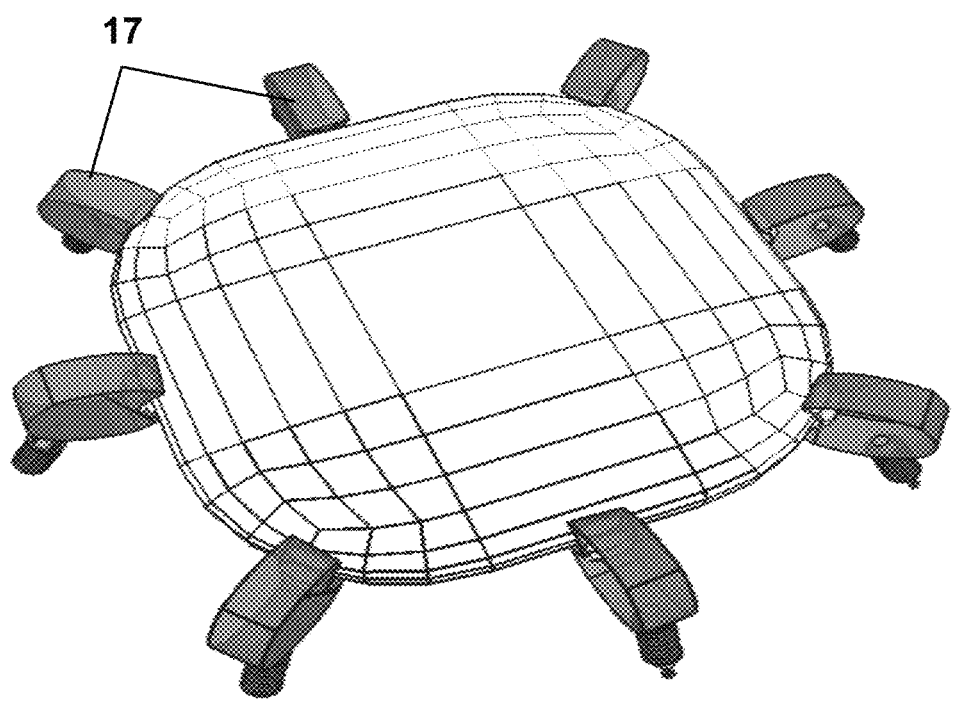
Figure 21C:
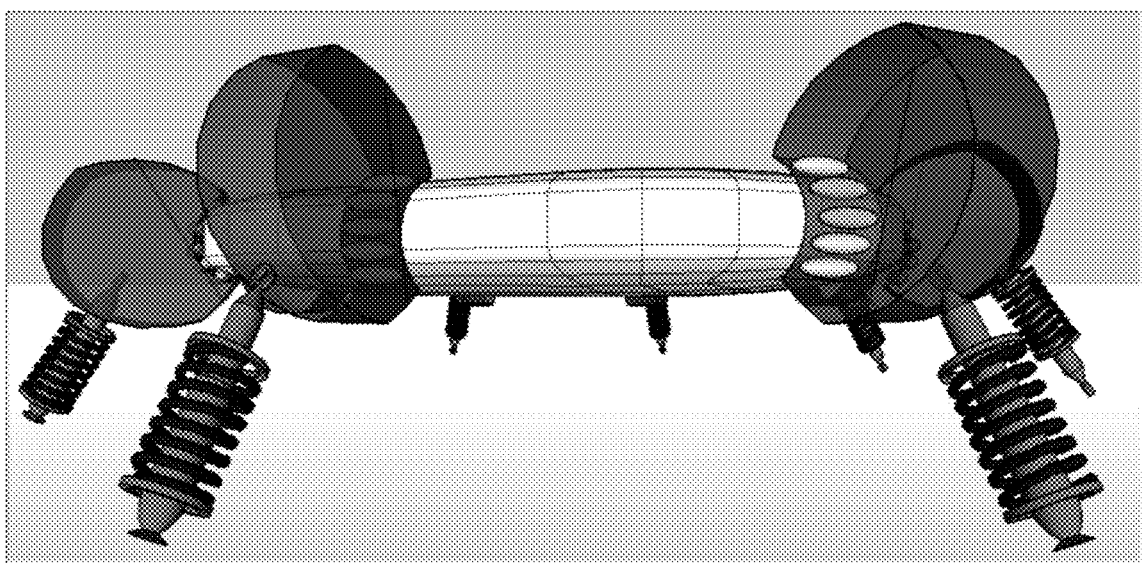
Figure 21D:
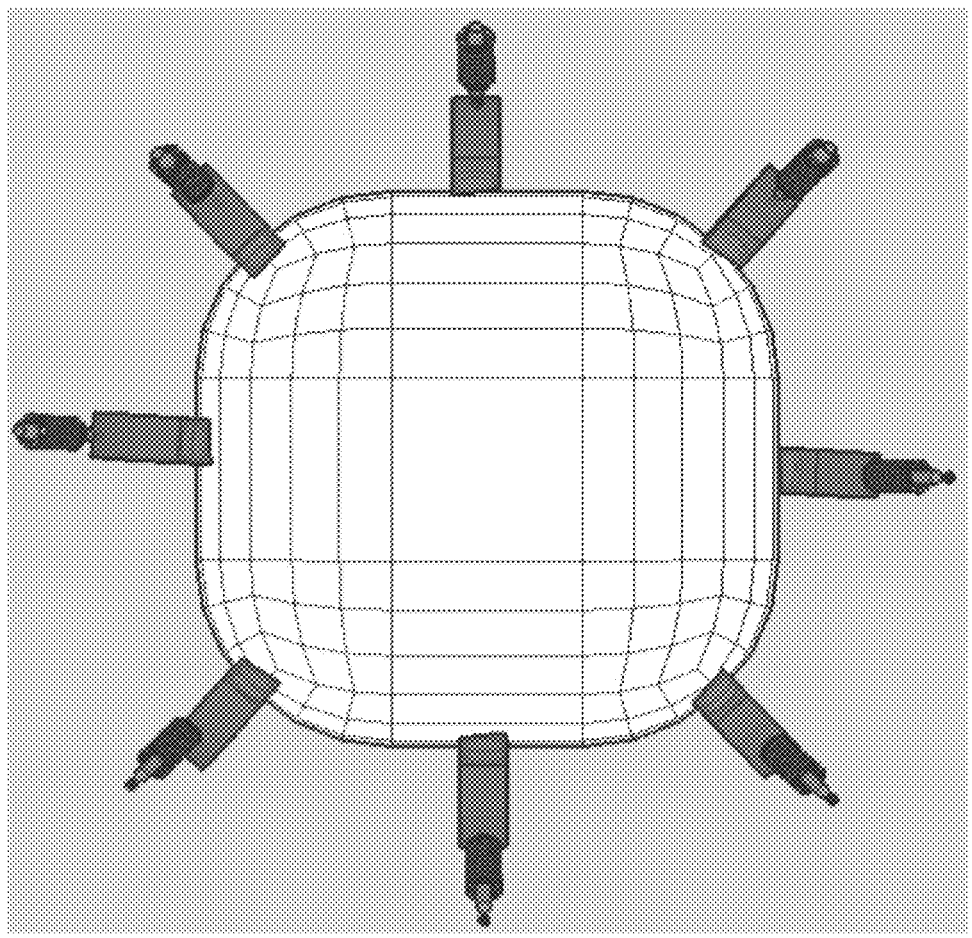
Figure 21E:
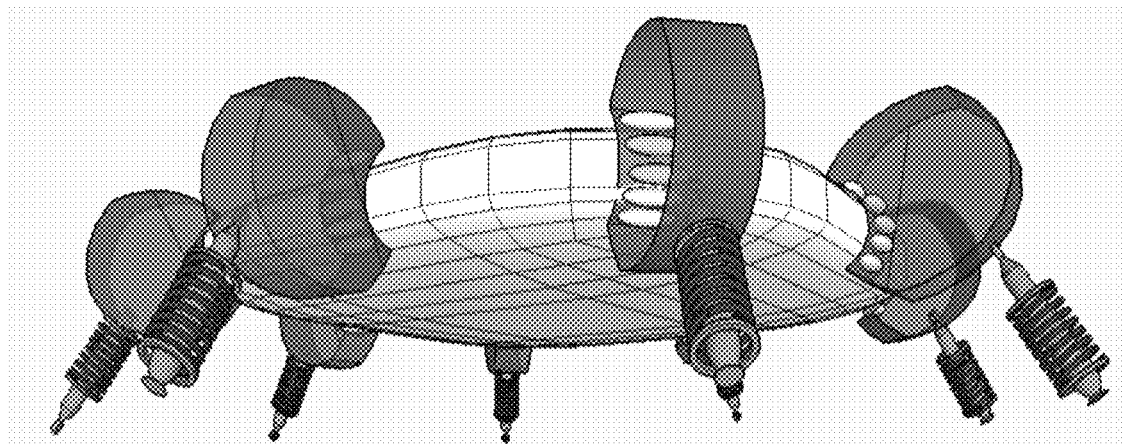
Figure 21F:
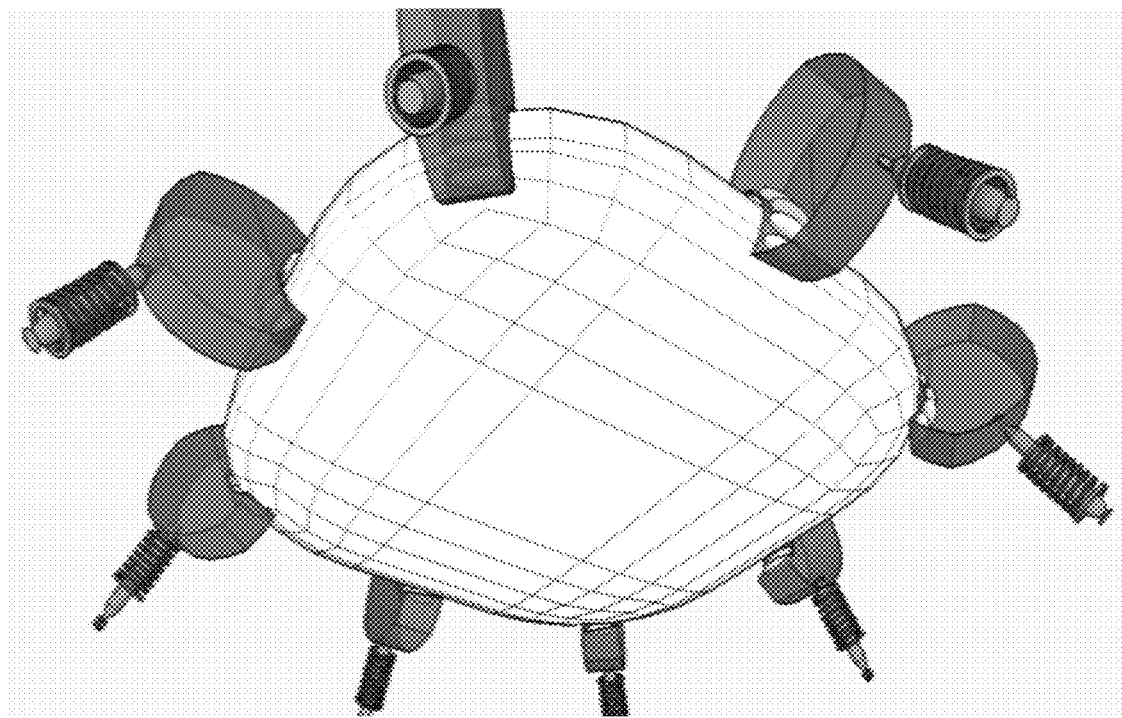

The entire device is contained within a stage (a box that surrounds the device, or device sunk in floor) (FIGS. 5 and 20) that provides safety to the user and hides the mechanics of the device from both eye and limb. The entire stage may be rotated, i.e stay true north) or tilted (slope/hill). The stage has a fence around it to keep users in and spectators out. The stage has steps to walk up to, and enter the device safely. The stage contains a power unit, a cord, and a wall plug which powers the device.

The Input/Output Digital Control System and CPU

Handle Enable/Disable (on/off)

Receive all sensor positive/negative weight measurements.

Output all Control Sphere Velocity Instructions.

Channel Incoming Sound so that the sound is projected to the head direction of the user.

Relay velocity to game/simulation.

A digital signal processing (DSP) chips and calculation CPU may be used.

Concentric Multiple Stage Upgrade System

Figure 11:
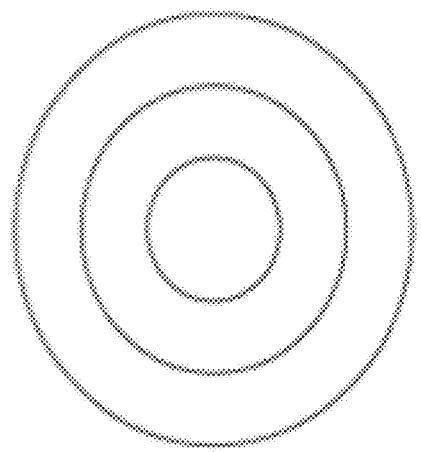
FIG. 11 shows a top view of the concentric, multi-stages structure of the moving floor device. The inner core is located in the center of the stage. The outer ring-like stages are used for upgrading the functionalities of the device.

The entire system is designed to work with a Concentric Multiple Upgrade System that allows one "stage" to be placed directly in another in a preplanned order to enhance and add features to the system (FIG. 11).

Stage 1 is the center most piece and is the moving floor.

Stage 2 is the tilt/swivel/rotate upgrade stage.

Stage 3 adds 360 degree surround sound that tracks the users head and makes sure the sound is coming from the right direction as transmitted to the sound system or VR headphones.

Other stages may include the control of ambient light and fans (wind), smell, rain, or other environmental factors normally found.

True North Rotate, Tilt and Swivel Features

This feature requires the moving floor device to be equipped with three hydraulic actuators located on the bottom of the stage and a rotating base, which holds up the moving floor. Two of the hydraulic actuators are located at the northeast and southeast corner of the stage, and one is located in the middle of the west side of the stage. Within the limitations of the hardware, the three actuators can simulate any degree of roll, incline, slope or tilt. The rotating base can swivel 360 degrees on the surface parallel to the top surface of the moving floor. It comprises a gear driven system with a variable speed multi-directional electric motor which propels the swiveling motion of the device. The rotate, tilt and swivel feature can be used with haptic feedback software to produce virtual environment effects.

Moving Floor Virtual Wall System

Figure 23A:
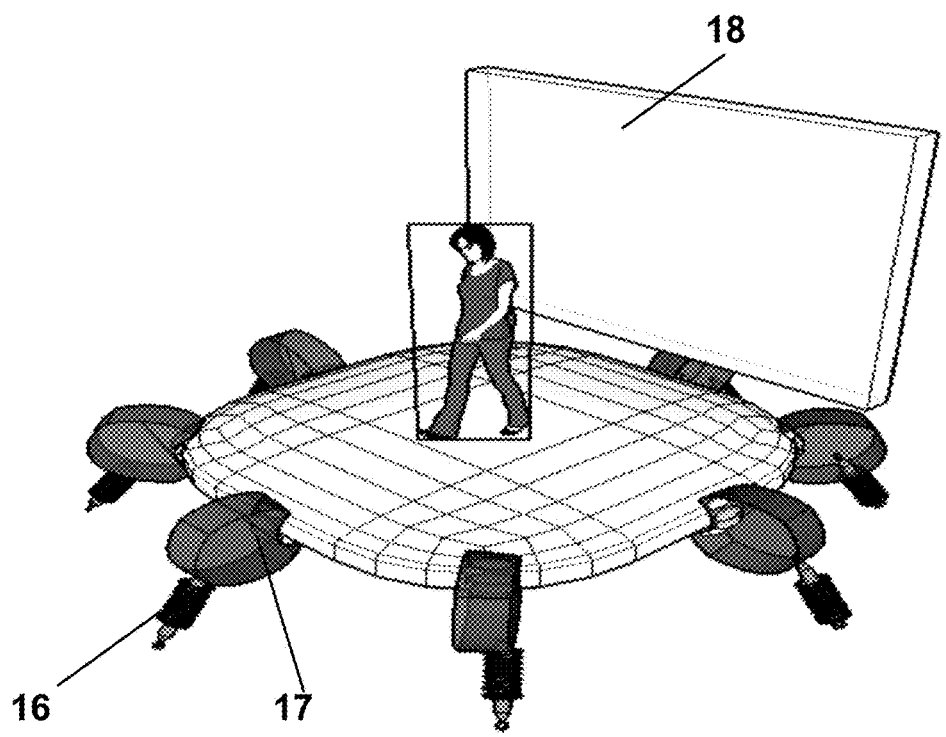
FIGS. 23A-23D depict the virtual reality interactive "Virtual Wall" enhancement, which allows virtual walls in virtual reality to be simulated in reality. It is facilitated by either moving the wall-like structure, or rotating the floor in 360 degrees, so that the wall-like structure is always in front of the user.

This feature allows the moving floor device to simulate walls within a virtual environment. There are four stout and safe walls around the moving floor portion or there can be one wall when the device uses the "true north" feature that can rotate the moving floor 360 degrees so that the one wall 18 is always in front of the user (FIG. 23A). This feature can greatly improve the ability of the moving floor device to simulate real world environments, especially those involving walls or other obstacles. The wall(s) may be a moving wall or a partial wall, such as one wall, or the wall may be a complete enclosure comprising joined and/or circular walls surrounding the entire moving floor device. The wall may also fold down in whole or partially, to provide the user with a place to sit, creating a temporary chair.

When a wall is reached in a virtual environment, the centering system on the moving floor temporarily disables itself, allowing the user to actually walk into a real wall surrounding the moving floor stage. The system calculates the angle of the user's approach to the wall and aligns itself or the wall to the incoming user. The scale of distance from the user to the wall will be exactly the same between the virtual reality environment and the reality (i.e., if the user is 3 feet from a solid wall in a virtual environment, the user is exactly 3 feet away from the real wall 18 on the moving floor device.

Figure 23B:
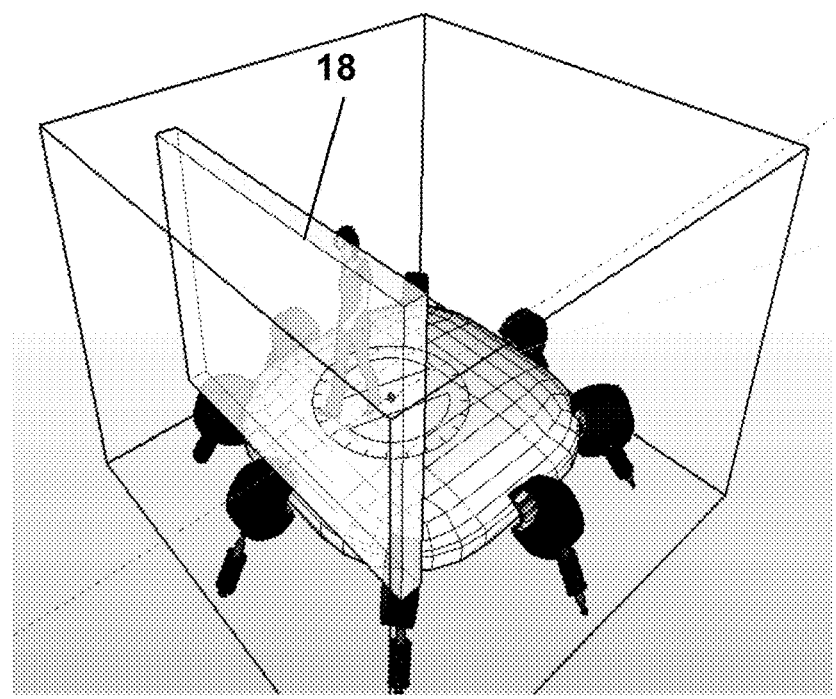
Figure 23C:
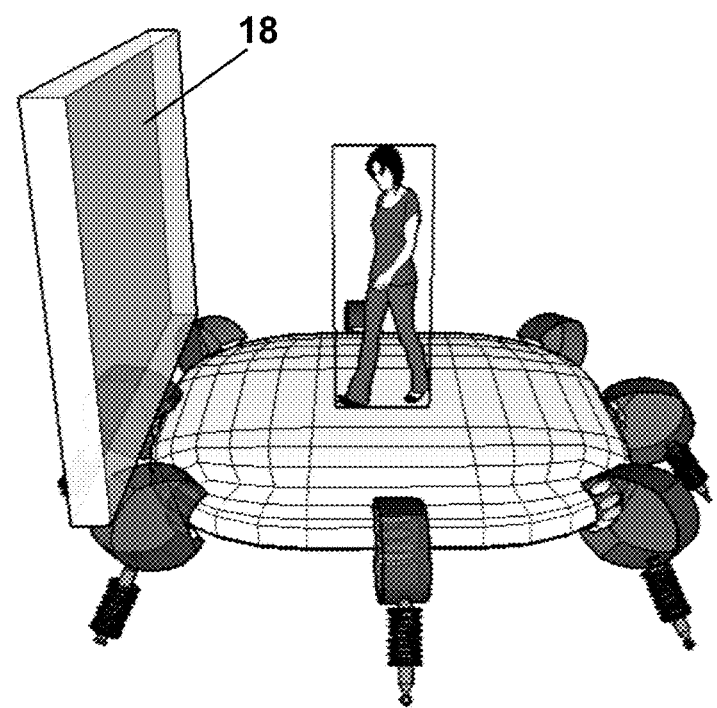
Figure 23D:
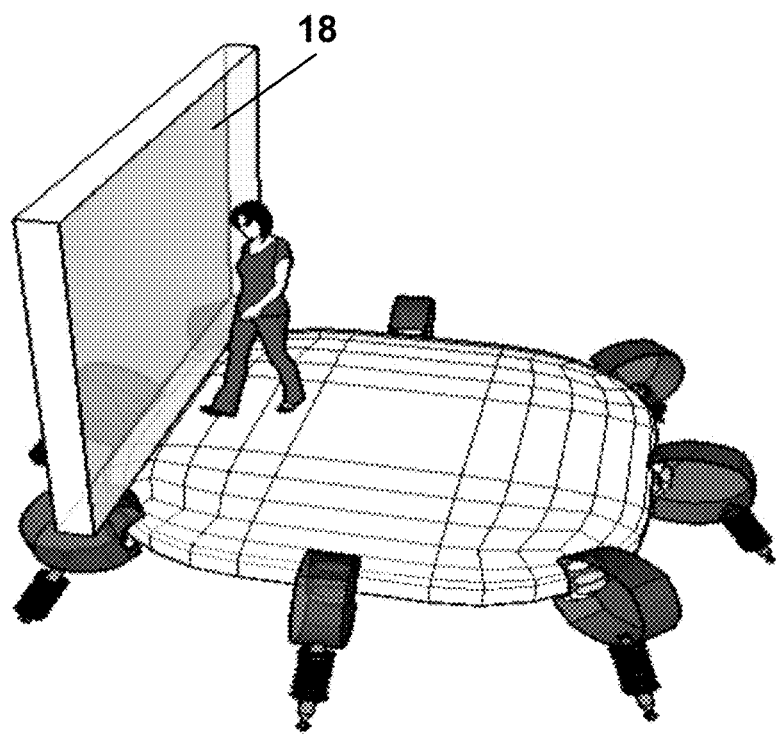

In reference to FIG. 23A, the user is walking in a direction away from the single wall 18 pictured directly behind her. Further, in FIG. 23B, the core has rotated beneath the user so that the wall is now in front of her. Alternatively, instead of the core, the wall can rotate or move in front of her. Or both the floor and wall can rotate in tandem to insure the user is always facing the single wall. In reference to FIG. 23C, a user can simultaneously approach a wall in a virtual reality environment at the same speed and direction as the real wall is directly in front of her. FIG. 23D depicts the user making contact with a wall in virtual reality at the simultaneous speed, direction, angle, and force as the real wall-like structure. This is facilitated by temporarily disabling the centering effect of the moving floor temporarily to allow the user to actually make contact with the wall.

Moving Floor Virtual Effects Engine

This feature enables the moving floor device to shake and/or move to simulate earthquakes (or simple shaking), being hit (i.e. floor being slightly pulled away from the user), explosion, dizziness (floor moves in whirlpool direction), stun (floor rotates to both left and right swivel with variable intensity). Other similar effects such as getting punched, being knocked off the feet, vertigo, getting struck by a bullet can also be simulated.

All these effects are generated by a combination of three mechanisms. The first one is the movement of the floor that directly contacts the user's feet. It can startle the user or simply knock down the user. For instance, when a user is punched in the virtual reality, the floor moves for 3 feet to knock the user backwards. The second mechanism is generating shaking motion by the control arms. The extent of the vibration goes from a subtle vibration to a shaking force that will knock the user from their feet. For example, a grenade explosion occurred 20 feet away from the user in the virtual reality triggers strong shaking motion of the moving floor device. The third mechanism is the rotation of the rotating plate. As the intensity of rotating motions varies, the users feel stunned, disoriented or even dizzy.

Dome Structure for Glasses Free VR Experience

Figure 12:
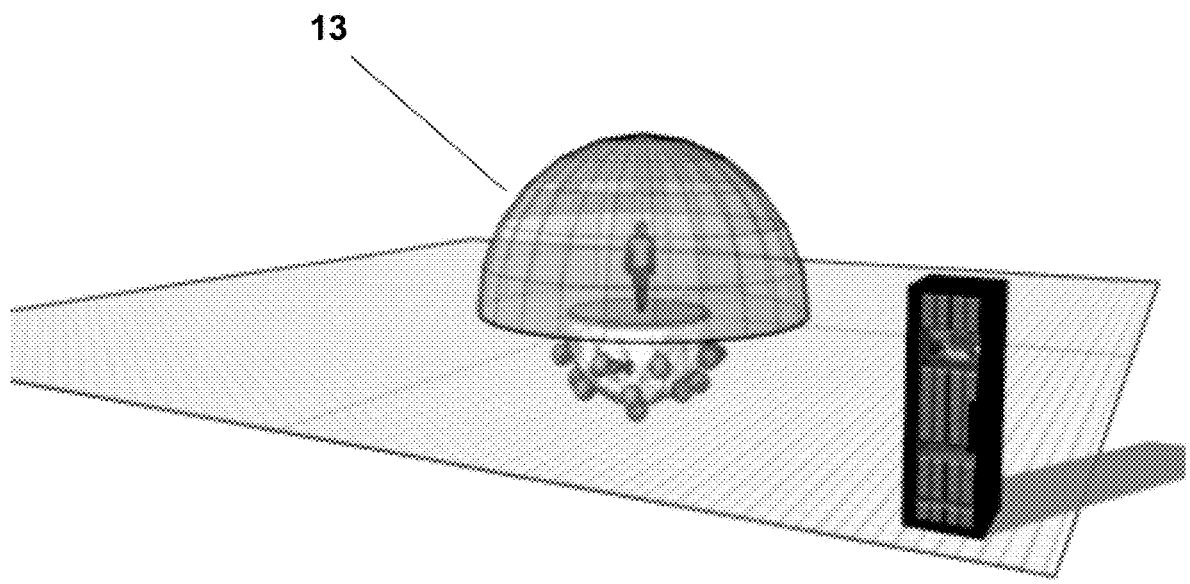
FIG. 12 depicts the scenario where the user is standing on the center of the moving floor device coupled with a dome-like screen as the virtual reality device.

By using newly invented bendable high-resolution screen technology it is possible to encase the user in a dome 13 that eliminates the need for VR glasses entirely (FIG. 12). The Flexible Outer Skin may be also made from this bendable display surface. The combination of the two would provide a near reality.

Possible uses include but are not limited to gaming travel simulation; military simulation exercise and rehabilitation; casual entertainment; control of drones or other remote ground or air based assets; walking on a map google street view integration; and communication.

Possible Synergistic Devices include but are not limited to VR Glasses; Head Phones; Wii Controllers; Gaming Rifles; Military Rifle Simulation Devices; Feedback Gloves; Hologram Projectors and 360 degree video recording equipment The following examples are given for the purpose of illustrating various embodiments of the invention and are not meant to limit the present invention in any fashion.

Example 1

Memory Playback with 360° Camera

During the wedding ceremony, the bride wears a gyro-stabilized micro-camera that is embedded on top of her wedding veil to film the scene in 360 degrees. After the wedding, the video is uploaded to a computer. She then goes to the moving floor device and walk the exact same path repeatedly, essentially re-experiencing her wedding. During the re-experiencing process, she can proceed forward or go backward in time in the virtual environment. As she walks down the isle toward the minister she sees time moving forward. If she walks backward in the wedding isle, time reverses in the virtual reality (i.e. the 360° video). The viewer is able to observe the scenes in any direction due to the 360° filming. Other people may might also watch and experience the wedding playback using the moving floor device.

Example 2

Integration with GOOGLE STREETVIEW and GOOGLE EARTH

A user is looking for an apartment. He hops on the moving floor device, puts his glasses on, and enables GOOGLE STREETVIEW mode. He instructs the system to put him at the address of his proposed apartment. He then takes a walk around the vicinity to see if he likes the community.

A student in world geography class uses the moving floor device coupled with a pair of virtual reality glasses to explore the world in GOOGLE EARTH. He is able to set her height at 1 mile and walks the globe in the view of a giant. When reaches the destination, he can reduce his virtual height to normal and walk around.

Example 3

Sharing the Experience Via Social Network Using a Virtual Reality Device

A user shares his vacation in the Amazon on a social network in 360° high-resolution video. The shared link provided allows others to go on the same path and see the Amazon by themselves. They do not necessarily see the same things as the user who shot the video, since they can look in completely different directions from other users.

Example 4

Enhanced Communication Experience Using the Moving Floor Device

A parent on a business trip can experience a soccer match of his kids from 800 miles away. The live 360° video signal is sent in real time. The remote camera is on a motorized base, which moves in synchronization with the user on the moving floor. This system also transmits two-way audio and video to enable real time communication.

Example 5

Military Tasks

A soldier in Virginia guides an entire platoon of drones equipped with real-time 360° video cameras. He only controls the first drone, which follows his every move. All other drones in the platoon automatically follow the command drone. All other slave drones fire on the same target, as the command drone. If the command drone becomes inoperable, the next slave drone becomes the command drone. This would in effect give a single soldier multiple lives on the battlefield, without any mortal risk. This would also be literally a force multiplier.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A multi-functional moving floor device for interacting with a virtual reality system, comprising:
   a substantially hemispherical body with a flat top surface to support a user standing thereon and an inner core comprising:
      a movable outer flexible skin wrapped around the inner core; and
      a lubricant and/or a ball bearing layer located in a pressurized vacuum space between the movable outer flexible skin layer and the inner core;
   a control module comprising:
      a plurality of control arms comprising actuators and in a supporting relationship with a shock absorption system;
      a plurality of weight sensors integrated with said control arms;
      a plurality of control spheres circumferentially disposed on the flat top surface of the inner core and in a movable relationship with said outer flexible skin; and
      a plurality of core receiver-support modules each with a C-shaped body attached to the control arms in a supporting relationship with the inner core and a pinching relationship with the outer flexible skin and each with a motor compartment containing electric motors and sensors to drive the control sphere;
   an action module comprising:
      at least three hydraulic actuators located on a bottom of the device and a variable speed, multidirectional motor-driven rotating base in connection with the device;
   a wall module comprising:
      a ring-like extension stage with a substantially concentric structure disposed around the substantially hemispherical body of the device;
      at least one wall-like structure disposed on at least one side of said extension stage to simulate wall-like obstacles in every direction in a virtual environment; and
      a driving element connected to the rotatable ring-like extension stage to propel the extension stage in a rotating motion;
   a computer comprising at least one processor, at least one memory and an interface communicably connected with said control module, said action module, said wall module and the virtual reality system; and
   means to activate and deactivate the device.

2. The device of claim 1, wherein said inner core is of a rotund design with a flat top surface, a rotund bottom surface and a heavy metal disposed at the bottom thereof, said weight and stability of the device thereby increased.

3. The device of claim 1, wherein said inner core is of a symmetrical pill-shaped design with a flat top surface, a flat bottom surface and a curved side surface disposed there between.

4. The device of claim 1, wherein the outer flexible skin comprises:
   a smooth inner layer that is in direct contact with said lubricant or ball bearing layer of the device;
   a mesh layer attached underneath the outer layer;
   an outer layer with a rough surface that is in direct contact with the bottom of a user's foot; and
   a center layer filled with a non-Newtonian liquid.

5. The device of claim 1, further comprising a plurality of concave dimples located on a surface of said inner core to reduce friction between the outer flexible skin and the inner core.

6. The device of claim 1, wherein the outer flexible skin is a conveyor belt.

7. The device of claim 1, wherein the control arms with a circular metal bar attached thereto form a cradle for the inner core.

8. The device of claim 1, wherein the control sphere is in a-ball-in-a-cup configuration, comprising:
   a spherical cup;
   a ball disposed inside the spherical cup and turnable therein in 360 degrees in any direction in direct contact with an outside surface of said outer flexible skin;
   at least three rollers attached to the wall of said spherical cup and disposed inside the outer flexible skin and in direct contact with an inside surface of said outer flexible skin mechanically turn the ball inside the cup; and
   at least one variable speed electric motor coupled with each roller.

9. The device of claim 1, wherein the C-shaped body comprises a plurality of openings on an end thereof and along an inside curve thereof containing the motor compartments.

10. The device of claim 1, wherein said hydraulic actuators and motor driven rotating base generate a rolling motion, a tilting motion, a swiveling motion, a shaking motion, a rotating motion or a combination thereof and to enable a user to keep facing in a same direction.

11. The device of claim 1, wherein the means to activate and deactivate the device are gesture activated switches, voice recognition, or a remote control from a smart electronic device.

12. The device of claim 11, wherein the gesture activated switches are activated with a predetermined motion applied to the flat top surface of the moving floor device.

13. The device of claim 12, wherein said predetermined motion is walking, jumping, sliding, or crawling or a combination thereof.

14. The device of claim 1, wherein said virtual reality system is virtual reality glasses, a game console, a computer, a smart phone, a tablet or a dome structured virtual reality screen.

15. A user-customized method for interacting with virtual reality, comprising the steps of:
 activating the moving floor device of claim 1;
 connecting the moving floor device to the virtual reality system;
 determining the initial position of the user in a virtual reality environment;
 user-applying a movement or a series of movements to the flat top surface of the substantially hemispherical body of the moving floor device;
 generating signals based on increased or decreased weight on the flat top surface;
 transmitting the signals to the virtual reality system and to the control module;
 moving via the control module a moving floor portion of the device in a direction opposite to the user's movement for the same distance with the same velocity as the user's movement; and
 changing the user's position in the virtual reality environment based on the transmitted signals.

16. The user-customized method of claim 15, further comprising:
 activating the wall module as the distance between the user and a virtual wall like object in the virtual reality environment becomes less than a predetermined value;
 deactivating the control module;
 user-walking to a wall-like structure comprising the wall module;
 deactivating the wall module as the distance between the user and said virtual wall like object becomes greater than said predetermined value; and
 reactivating the control module to move the moving floor portion of the device.

* * * * *